US012002188B2

United States Patent
Takagi et al.

(10) Patent No.: US 12,002,188 B2
(45) Date of Patent: *Jun. 4, 2024

(54) OPTICAL MODULE AND VIRTUAL IMAGE DISPLAY DEVICE

(71) Applicant: SEIKO EPSON CORPORATION, Tokyo (JP)

(72) Inventors: Masayuki Takagi, Azumino (JP); Nobuhiko Yokoo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,342

(22) Filed: Apr. 13, 2023

(65) Prior Publication Data

US 2023/0260093 A1 Aug. 17, 2023

Related U.S. Application Data

(63) Continuation of application No. 17/513,909, filed on Oct. 29, 2021, now Pat. No. 11,657,482.

(30) Foreign Application Priority Data

Oct. 30, 2020 (JP) .................................. 2020-182872

(51) Int. Cl.
*G06T 5/80* (2024.01)
*G02B 17/00* (2006.01)
(Continued)

(52) U.S. Cl.
CPC .............. *G06T 5/80* (2024.01); *G02B 17/008* (2013.01); *G02B 27/0172* (2013.01);
(Continued)

(58) Field of Classification Search
CPC .. G06T 5/006; G02B 17/008; G02B 27/0172; G02B 2027/014; G02B 2027/0178;
(Continued)

(56) References Cited

U.S. PATENT DOCUMENTS

| 2007/0085863 A1* | 4/2007 | Moriya | ................ | G09G 3/3607 345/694 |
| 2007/0103491 A1* | 5/2007 | Moriya | ................ | G09G 3/3607 345/694 |

(Continued)

FOREIGN PATENT DOCUMENTS

| EP | 3564735 | 11/2019 |
| JP | 2008216343 | 9/2008 |

(Continued)

OTHER PUBLICATIONS

Chunyu Gao et al., "Optical see-through head-mounted display with occlusion capability," Proc. SPIE 8735, May 16, 2013, pp. 87350F-1-9.

(Continued)

*Primary Examiner* — Sarah Lhymn
(74) *Attorney, Agent, or Firm* — JCIPRNET

(57) ABSTRACT

An optical module according to the present disclosure includes: a first display panel that emits a first image light, a first virtual image optical system that forms a first exit pupil of the first image light, and a control unit corrects a video image signal to a first correction video signal based on distortion generated in the first optical system, an aspect ratio of the video image signal being smaller than an aspect ratio of the first display panel, wherein the control unit causes the first display panel to emit the first image light from the first display panel based on the first correction video image signal.

13 Claims, 14 Drawing Sheets

(51) Int. Cl.
*G02B 27/01* (2006.01)
*G09G 3/00* (2006.01)
*G09G 3/3208* (2016.01)

(52) U.S. Cl.
CPC ....... *G09G 3/001* (2013.01); *G02B 2027/014* (2013.01); *G02B 2027/0178* (2013.01); *G09G 3/3208* (2013.01); *G09G 2300/0439* (2013.01)

(58) Field of Classification Search
CPC .......... G02B 2027/011; G02B 17/0816; G02B 5/04; G02B 27/0176; G09G 3/001; G09G 3/3208; G09G 2300/0439
See application file for complete search history.

(56) References Cited

U.S. PATENT DOCUMENTS

| | | | |
|---|---|---|---|
| 2007/0268541 A1 | 11/2007 | Fujita et al. | |
| 2010/0045942 A1* | 2/2010 | Furui | H04N 9/3194 353/69 |
| 2010/0053569 A1* | 3/2010 | Furui | H04N 9/3185 353/121 |
| 2014/0036361 A1* | 2/2014 | Woodgate | G02B 6/0068 385/9 |
| 2014/0043320 A1 | 2/2014 | Tosaya et al. | |
| 2015/0346494 A1 | 12/2015 | Tanaka et al. | |
| 2016/0011419 A1 | 1/2016 | Gao | |
| 2016/0320615 A1* | 11/2016 | Nakamura | G02B 27/0961 |
| 2018/0129051 A1 | 5/2018 | Hung | |
| 2019/0377177 A1* | 12/2019 | Takahashi | G02B 30/28 |

FOREIGN PATENT DOCUMENTS

| | | |
|---|---|---|
| JP | 2019045630 | 3/2019 |
| WO | 02099507 | 12/2002 |
| WO | 02099508 | 12/2002 |
| WO | 2015008531 | 1/2015 |

OTHER PUBLICATIONS

"Office Action of U.S. Counterpart Application", dated Sep. 30, 2022, p. 1-p. 15.

"Notice of Allowance of U.S. Counterpart Application", dated Jan. 17, 2023, p. 1-p. 10.

* cited by examiner

OPTICAL MODULE AND VIRTUAL IMAGE DISPLAY DEVICE

This application is a continuation application of and claims the priority benefit of a prior application Ser. No. 17/513,909, filed on Oct. 29, 2021, now allowed. The prior application Ser. No. 17/513,909 claims the priority benefit of Japan application serial no. 2020-182872, filed on Oct. 30, 2020. The entirety of each of the above-mentioned patent applications is hereby incorporated by reference herein and made a part of this specification.

BACKGROUND

1. Technical Field

The present disclosure relates to an optical module and a virtual image display device.

2. Related Art

There has been known a virtual image display device that allows an observer to visually recognize an image displayed on a display panel as a virtual image positioned in front of an observer's pupil by guiding an image light emitted from the display panel to an exit pupil by a virtual image optical system. There may be a case where in a virtual image formed by the virtual image optical system, distortion occurs due to optical factors such as magnification chromatic aberration and distortion aberration.

WO 2015/008531 discloses a technique of correcting an image signal such that distortion for canceling distortion of a virtual image is imparted to an image displayed on a display panel in a virtual image display device where a virtual image formed by a virtual image optical system is distorted in a barrel shape or a spool shape. For example, in the virtual image display device disclosed in WO 2015/008531, in a case where a virtual image is distorted in a spool shape, an image signal is corrected such that an image displayed on the display panel has a barrel shape.

For example, in a case where a virtual image formed by the virtual image optical system is distorted in a fan shape, it is conceivable to adopt a distortion correction method where a reverse fan-shaped distortion for canceling the fan-shaped distortion of the virtual image is imparted to an image displayed on the display panel. However, when adopting this distortion correction method, a problem may arises that a virtual image formed by the virtual image optical system is visually recognized by an observer as an obscure image having color unevenness or the like at an upper end portion and a lower end portion of the virtual image.

To solve such a problem, there has been known a method where an effective display region of a display panel is divided into three regions in a vertical direction, out of three regions, an intermediate region is defined as an image display region, an upper region on an upper side of the intermediate region and a lower region on a lower side of the intermediate region are defined as blank regions. However, as described above, when the method where the effective display region of the display panel is divided into a plurality of regions is adopted, a capacity of a line memory used for virtual image distortion correction processing increases.

SUMMARY

To solve the above-described problems, an optical module according to an aspect of the present disclosure includes: a first display panel, a first optical system that forms a first exit pupil, and a control unit that corrects an input image to a first image based on distortion generated in the first optical system, an aspect ratio of the input image signal being smaller than an aspect ratio of the first display panel, wherein the control unit causes the first display panel to display the first image.

A virtual image display device according to an aspect of the present disclosure includes an optical module according to an aspect of the present disclosure.

DESCRIPTION OF EXEMPLARY EMBODIMENTS

Hereinafter, an embodiment of the present disclosure is described with reference to drawings.

Here, in the following drawings, in order to make each constitutional element easy to see, the scale of the dimension may be varied depending on the constitutional element.

Figure 1:
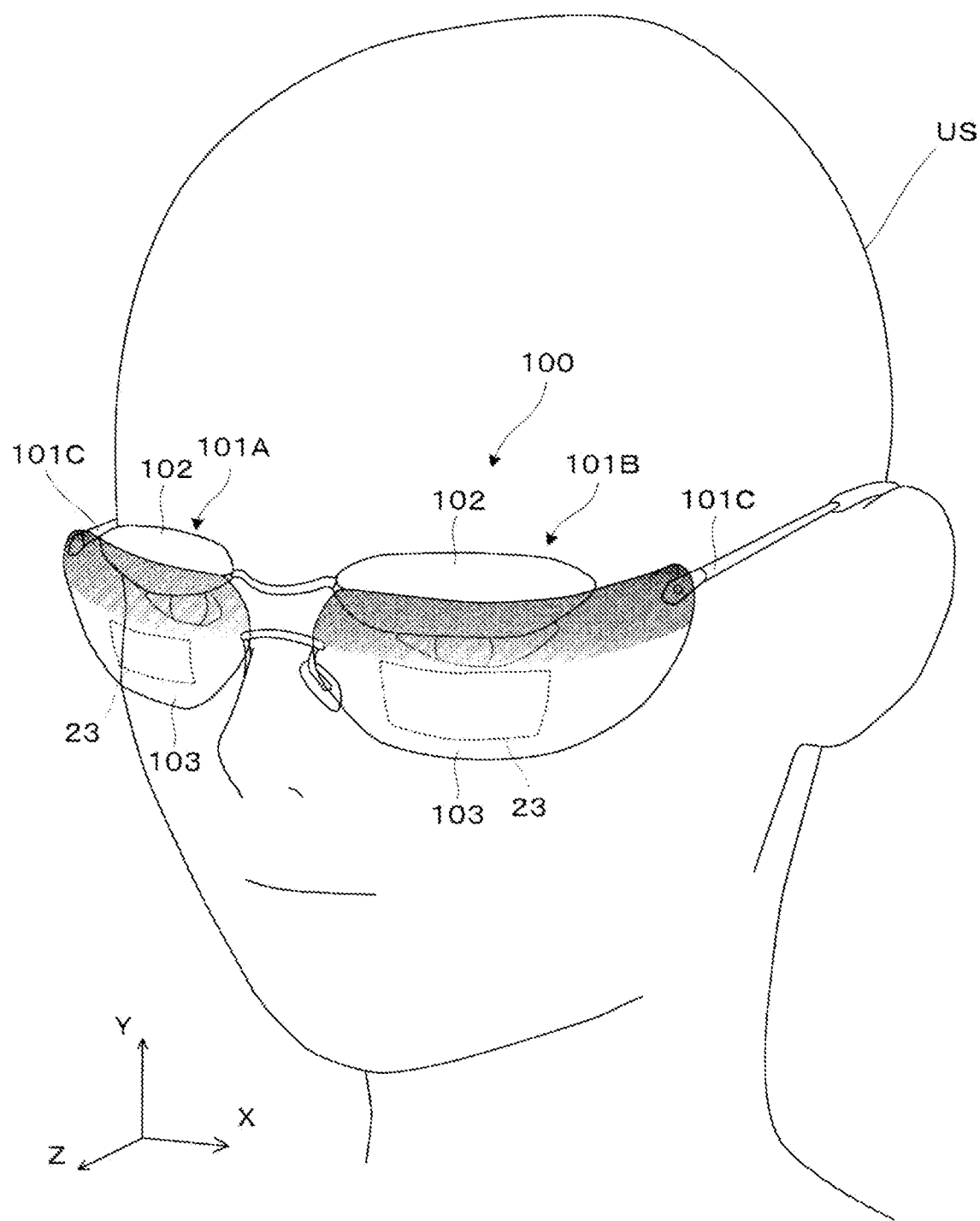
FIG. 1 is a view illustrating a state where an observer wears a virtual image display device according to a present embodiment.
Figure 2:
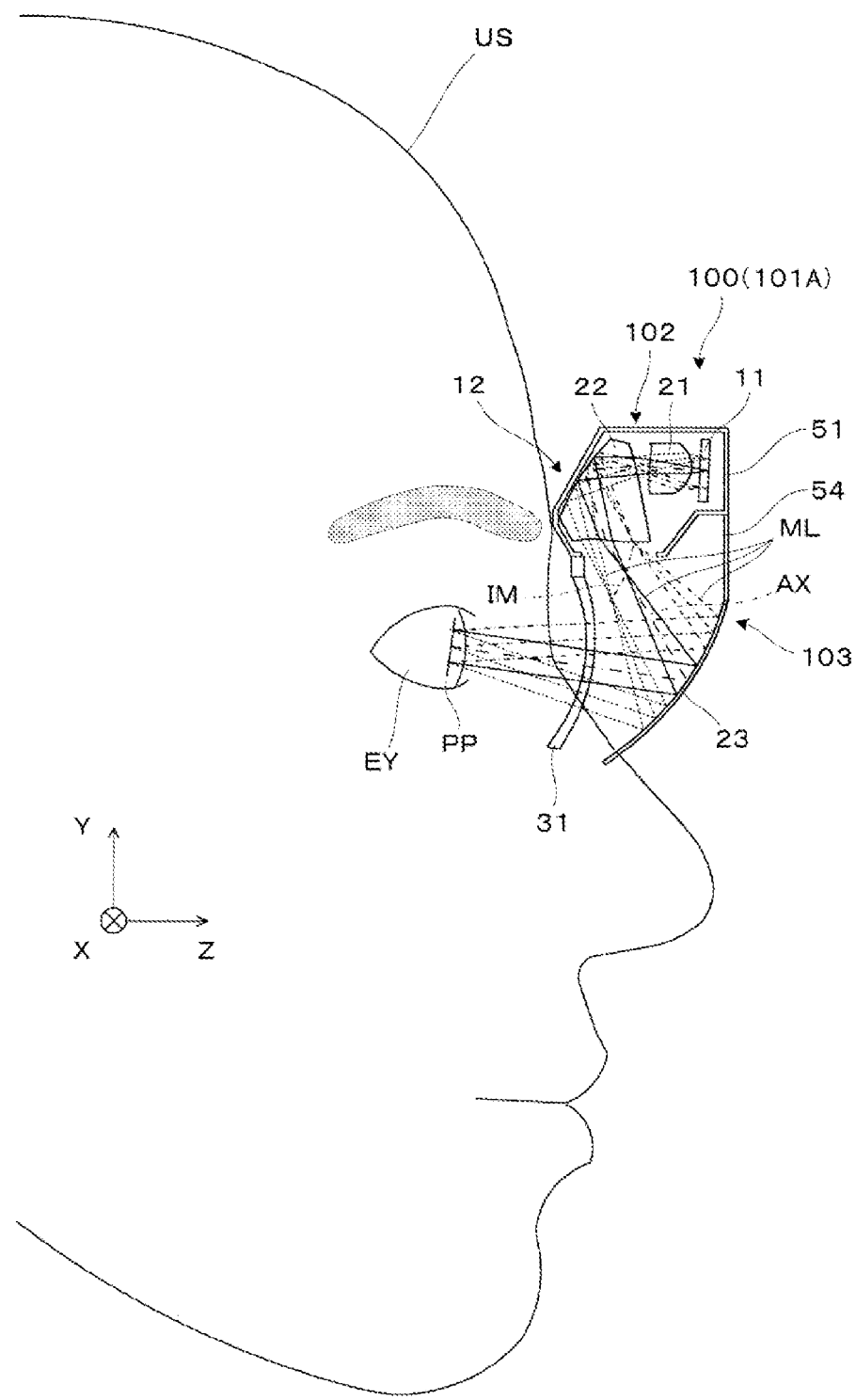
FIG. 2 is a side cross-sectional view of the virtual image display device according to the present embodiment.

As illustrated in FIG. 1 and FIG. 2, a virtual image display device 100 of the present embodiment is a head-mounted display (HMD) device having an external appearance like glasses, and the virtual image display device 100 allows a user US wearing the virtual image display device 100 to visually recognize a video image as a virtual image. In FIG. 1 and FIG. 2, symbols X, Y, and Z are axes of an orthogonal coordinate system, a +X direction corresponds to a lateral direction along which both eyes of the user US wearing the virtual image display device 100 are aligned, a +Y direction corresponds to an upward direction orthogonal to the lateral direction along which both eyes of the user US are aligned as viewed from the user US, and a +Z direction corresponds to a frontward direction or a front surface direction as viewed from the user US.

The virtual image display device 100 includes: a first display device 101A configured to form a virtual image with respect to the right eye, a second display device 101B configured to form a virtual image with respect to the left eye, and temple-shaped support devices 101C configured to support both the display devices 101A and 101B. The first display device 101A is constituted of an optical module 102 disposed on an upper portion of the first display device 101A, and an external appearance member 103 that has a spectacle lens shape and covers the whole first display device 101A. In the same manner, the second display device 101B is also constituted of an optical module 102 disposed on an upper portion of the second display device 101B, and an external appearance member 103 that has a spectacle lens shape and covers the whole second display device 101B. The support devices 101C support both display devices 101A and 101B at upper end sides of the external appearance members 103 by members not illustrated in the drawings that are disposed behind the external appearance members 103.

Figure 3:
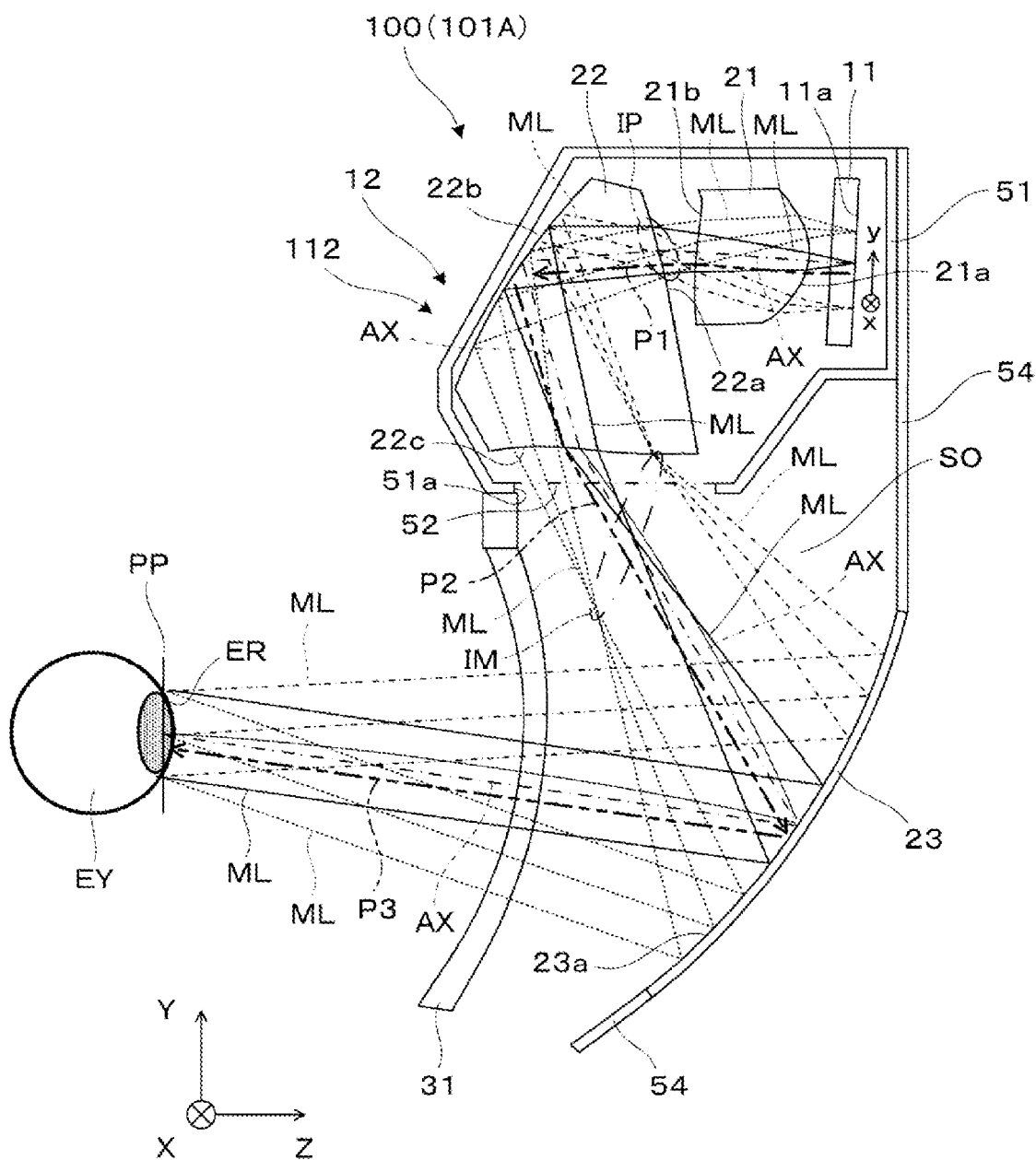
FIG. 3 is a side cross-sectional view illustrating an internal structure of the virtual image display device according to the present embodiment.

As illustrated in FIG. 2 and FIG. 3, the optical module 102 of the first display device 101A for the right eye includes a first display panel 11 and a first virtual image optical system 12 as optical elements. The first display panel 11 displays a first image, and emits first image lights ML expressing the first image. The first virtual image optical system 12 forms a first exit pupil PP by the first image lights ML emitted from the first display panel 11. The second display device 101B for the left eye has substantially the same structure as the first display device 101A. That is, although not illustrated in the drawings, the optical module 102 of the second display device 101B includes a second display panel and a second virtual image optical system as optical elements. The second display panel displays a second image, and emits a second image light showing the second image. The second virtual image optical system forms a second exit pupil by the second image light emitted from the second display panel. Hereinafter, the description is made with respect to the first display device 101A, and the description with respect to the second display device 101B is omitted.

The first display panel 11 is a self-luminous display panel. The first display panel 11 is an organic light emitting diode (OLED) panel having a plurality of pixels each constituted of the OLED, for example. The first display panel 11 is a flat plate-like panel having a rectangular shape. The first display panel 11 includes a display surface 11a that displays a first image. The display surface 11a is an effective display region of the first display panel 11.

As illustrated in FIG. 3, the first virtual image optical system 12 includes a projection lens 21, a prism 22, and a see-through mirror 23. The projection lens 21 converges the first image lights ML emitted from the first display panel 11 into a state where the first image lights ML substantially form a parallel luminous flux. The projection lens 21 is a single lens, for example, and has an incident surface 21a and an emission surface 21b. The prism 22 has an incident surface 22a, an inner reflective surface 22b, and an emission surface 22c. The prism 22 allows the first image lights ML emitted from the projection lens 21 to be incident on the incident surface 22a while being refracted, to be totally reflected by the inner reflective surface 22b, and to be emitted from the emission surface 22c while being refracted. The see-through mirror 23 reflects the first image lights ML emitted from the prism 22 toward the first exit pupil PP. The first exit pupil PP is at a position where the first image lights ML from respective points on the display surface 11a are incident on the first exit pupil PP in a superposed manner from angular directions corresponding to positions of the respective points on the display surface 11a, in a predetermined divergent state or a parallel state. A field of view (FOV) of the first virtual image optical system 12 is 44°, for example. The display region of a virtual image formed by the first virtual image optical system 12 is a rectangular shape, and the 44° is an angle in a diagonal direction.

The projection lens 21 and the prism 22 are accommodated in a case 51 together with the first display panel 11. The case 51 is formed of a light shielding material. An opening 51a of the case 51 has a size such that the opening 51a does not obstruct the first image lights ML from the prism 22 toward the see-through mirror 23. The opening 51a of the case 51 is covered by a protective cover 52 having light transmissivity. The protective cover 52 is formed of a resin material or the like that does not have optical power and allows the first image lights ML to pass therethrough without attenuating the first image lights ML. The see-through mirror 23 is supported by the case 51 by way of a support plate 54. The case 51 or the support plate 54 is supported by the support device 101C illustrated in FIG. 1. The support plate 54 and the see-through mirror 23 constitute the external appearance member 103.

The first virtual image optical system 12 is an off-axis optical system. The projection lens 21, the prism 22, and the see-through mirror 23 are arranged to form an off-axis system 112. "The first virtual image optical system 12 is an off-axis optical system" means that, in the optical elements 21, 22, and 23 that constitute the first virtual image optical system 12, an optical path is folded as a whole before and after light beams are incident on at least one reflective surface or refractive surface. In the first virtual image optical system 12, that is, in the off-axis system 112, an optical axis AX is folded such that the optical axis AX extends along an off-axis plane SO corresponding to a paper surface. That is, in the first virtual image optical system 12, by folding the optical axis AX within the off-axis plane SO, the optical elements 21, 22, and 23 are arranged along the off-axis plane SO. The off-axis plane SO is a plane where optical asymmetry is generated in multiple stages in the off-axis system 112. The optical axis AX extends along an optical path of main light beams emitted from the center of the first display panel 11, and passes through the center of an eye ring ER or the center of a pupil corresponding to an eye point. That is, the off-axis plane SO on which the optical axis AX is arranged is parallel to a YZ plane, and passes through the center of the first display panel 11 and the center of the eye ring ER corresponding to the eye point. The optical axis AX is arranged in a Z shape when viewed in a transverse cross section. That is, in the off-axis plane SO, an optical path P1 from the projection lens 21 to the inner reflective surface 22b, an optical path P2 from the inner reflective surface 22b to the see-through mirror 23, and an optical path P3 from the see-through mirror 23 to the first exit pupil PP are arranged in a Z shape, that is, are folded in two stages.

In the first virtual image optical system 12, the optical path P1 from the projection lens 21 to the inner reflective surface 22b is in a state nearly parallel to the Z direction. That is, in the optical path P1, the optical axis AX extends substantially parallel to the Z direction or the front surface direction. As a result, the projection lens 21 is disposed so as to be sandwiched between the prism 22 and the first display panel 11 in the Z direction or the front surface direction. In this case, the optical path P1 from the prism 22 to the first display panel 11 extends in a direction close to the front surface direction. Here, a center axis HX extending in a horizontal direction with respect to the first exit pupil PP is a center axis assumed when the user US wearing the virtual image display device 100 faces frontward in an upright posture and in a relaxed state, and gazes in the horizontal direction or a horizontal line. Head shapes and head postures of the individual users US each wearing the virtual image display device 100 including arrangements of the eyes and arrangements of the ears of the users US and the like are different. However, by estimating an average head shape or an average head posture of the users US, the average center axis HX can be set with respect to the target virtual image display device 100. As a result of the above, in the inner reflective surface 22b of the prism 22, reflection angles of the light beams along the optical axis AX fall within a range of approximately 10° to 60°. Further, in the see-through mirror 23, reflection angles of the light beams along the optical axis AX fall within a range of approximately 20° to 45°.

In the off-axis plane SO, an intermediate pupil IP is disposed between the projection lens 21 and the inner reflective surface 22b of the prism 22 and on an incident surface 22a side of the prism 22 with respect to the projection lens 21 and the inner reflective surface 22b. To be more specific, the intermediate pupil IP is disposed at a position of or in the vicinity of the incident surface 22a of the prism 22. For example, the intermediate pupil IP is disposed on an inner reflective surface 22b side with respect to the incident surface 22a of the prism 22. In this case, the position of the intermediate pupil IP is set closer to the incident surface 22a than the inner reflective surface 22b. The intermediate pupil IP may be disposed on a projection lens 21 side with respect to the incident surface 22a of the prism 22. In this case, the position of the intermediate pupil IP is set closer to the incident surface 22a than the emission surface 21b of the projection lens 21. The intermediate pupil IP may be configured to intersect with the incident surface 22a of the prism 22. The intermediate pupil IP means a portion where the first image lights ML from respective points on the display surface 11a are spread most and are overlapped with each other, and is disposed at a conjugate point of the eye ring ER or the first exit pupil PP. It is desirable that an aperture diaphragm be disposed at a position of or in the vicinity of the intermediate pupil IP.

The intermediate image IM is formed between the prism 22 and the see-through mirror 23. The intermediate image IM is formed closer to the prism 22 than to the see-through mirror 23. By forming the intermediate image IM closer to the prism 22 than to the see-through mirror 23 in this manner, a burden on the see-through mirror 23 for expansion can be reduced, and aberrations of an observed virtual image can be suppressed. However, the intermediate image IM is not in a state where the intermediate image IM intersects with the emission surface 22c of the prism 22. That is, the intermediate image IM is formed outside the emission surface 22c, and this arrangement relationship is established not only on the off-axis plane SO but also at an arbitrary point on the emission surface 22c in the transverse direction or the X direction perpendicular to the off-axis plane SO. As described above, since the intermediate image IM is formed so as not to traverse the emission surface 22c of the prism 22, it is possible to easily avoid that the image formation is adversely influenced by dust or scratches present on the emission surface 22c. The intermediate image IM is a real image formed at a position that is on an upstream side of the eye ring ER in the optical path and is conjugated to the display surface 11a, and has a pattern corresponding to an image displayed on the display surface 11a. However, the intermediate image IM does not need to be a sharply formed image, and may be an image exhibiting various aberrations such as an image surface curvature, a distortion aberration, and the like. With respect to a virtual image observed at the first exit pupil PP, if aberrations are eventually corrected favorably, the aberrations of the intermediate image IM do not matter.

Figure 4:
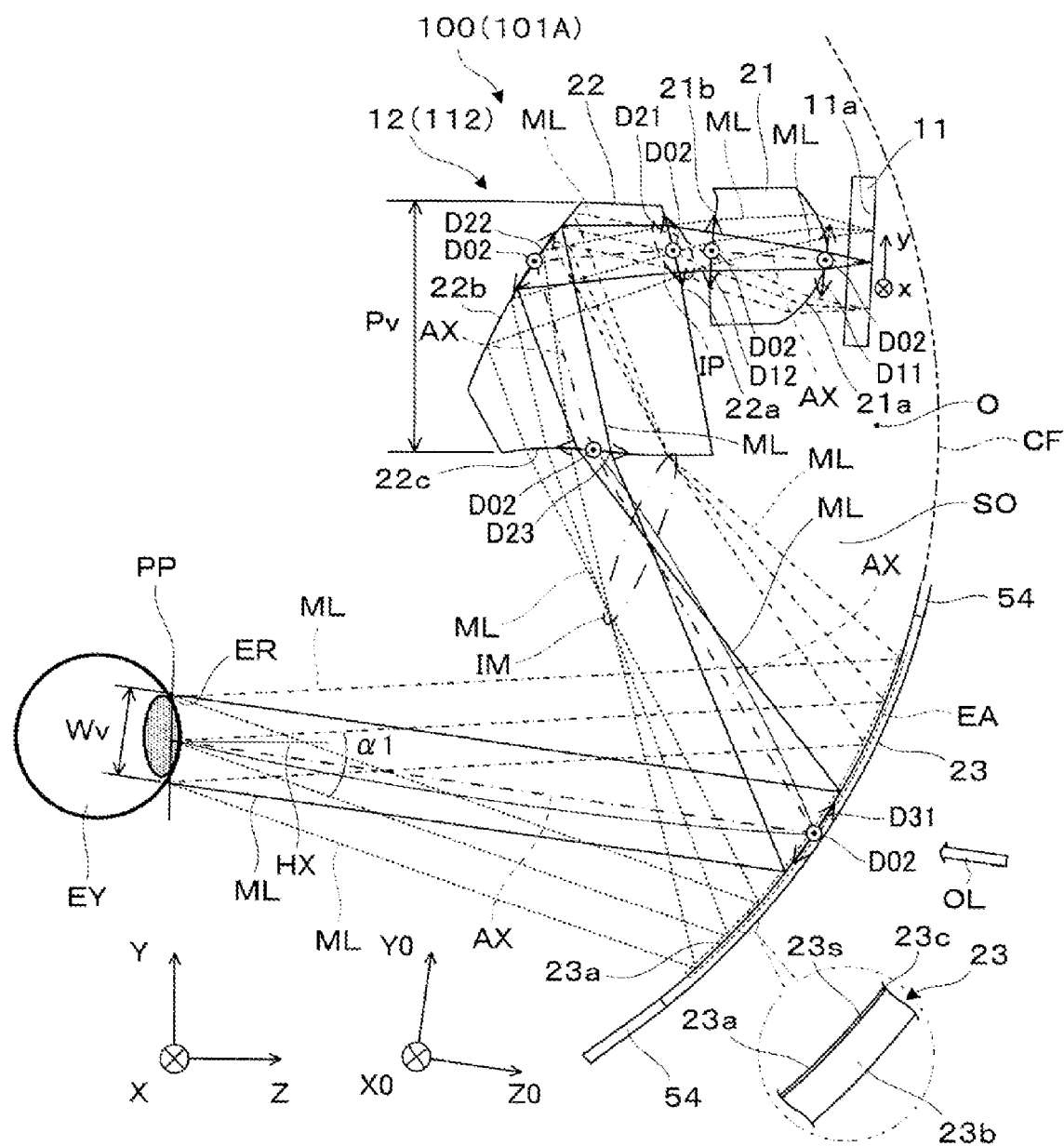
FIG. 4 is a side cross-sectional view illustrating a virtual image optical system that the virtual image display device according to the present embodiment includes.
Figure 5:
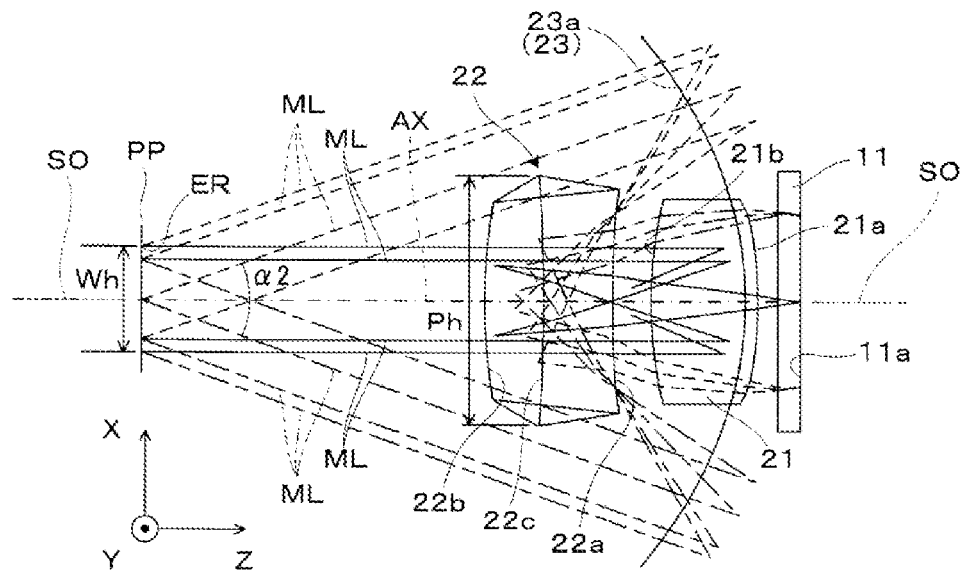
FIG. 5 is a plan view illustrating the virtual image optical system that the virtual image display device according to the present embodiment includes.

The shapes of the projection lens 21, the prism 22, and the see-through mirror 23 are described in detail with reference to FIG. 4 and FIG. 5. FIG. 4 is a side cross-sectional view of the first virtual image optical system 12, and FIG. 5 is a plan view of the first virtual image optical system 12. In FIG. 5, the optical surfaces 21a, 21b of the projection lens 21, the optical surfaces 22a, 22b, 22c of the prism 22, and the reflective surface 23a of the see-through mirror 23 are projected on an XZ plane through the optical axis AX.

In this case, the projection lens 21 is constituted of a single lens. The incident surface 21a and the emission surface 21b that are optical surfaces constituting the projection lens 21 each have an asymmetry with respect to the optical axis AX in first vertical directions D11, D12 that are within the off-axis plane SO parallel to the YZ plane and intersect with the optical axis AX, and have symmetry with respect to the optical axis AX in a second transverse direction D02 or the X direction orthogonal to the first directions D11, D12. The first vertical direction D11 relating to the incident surface 21a and the first vertical direction D12 relating to the emission surface 21b form a predetermined angle therebetween. The projection lens 21 is made of a resin, for example, but may be made of glass. The incident surface 21a and the emission surface 21b of the projection lens 21 are each formed of a free form surface, for example. The incident surface 21a and the emission surface 21b are not limited to the free form surface, and may be formed of an aspheric surface respectively. In the projection lens 21, by forming the incident surface 21a and the emission surface 21b by the free form surface or the aspheric surface, the aberration reduction can be achieved and, particularly, when the incident surface 21a and the emission surface 21b are each formed by the free form surface, aberrations of the first virtual image optical system 12 that is an off-axis optical system or a non-coaxial optical system can be easily reduced. The free form surface is a surface having no rotational symmetry axis, and various polynomials can be used as a surface function of the free form surface. Further, the aspheric surface is a surface having a rotational symmetry axis, but is a surface other than a paraboloid and a spherical surface expressed by a polynomial. Although the detailed description is omitted, an antireflective film is formed on the incident surface 21a and the emission surface 21b.

As described above, in the projection lens 21, as a result of forming the predetermined angle between the first direction D11 of the incident surface 21a and the first direction D12 of the emission surface 21b, relating to the optical path of the main light beams from the center of the display surface 11a of the first display panel 11, the emission surface 21b is formed in an inclined manner with respect to the incident surface 21a. That is, there is a relative angle or inclination between the incident surface 21a and the emission surface 21b and hence, it is possible to allow the projection lens 21 to have a function of partially compensating for the eccentricity of the first virtual image optical system 12 as the off-axis system 112 thus contributing to the improvement of the various aberrations. Further, due to the relative inclination between the incident surface 21a and the emission surface 21b, it is possible to impart a function of partially compensating for chromatic aberrations to the projection lens 21.

The prism 22 is a catadioptric optical member having both a function of mirror and a function of a lens, and is configured to reflect the first image lights ML from the projection lens 21 while refracting the first image lights ML. To be more specific, in the prism 22, the first image lights ML are incident into the prism 22 through the incident surface 22a that is the refractive surface, is totally reflected by the inner reflective surface 22b that is the reflective surface in an irregular reflection direction, and is emitted to the outside through the emission surface 22c that is the refractive surface. The incident surface 22a and the emission surface 22c are optical surfaces each formed of a curved surface and hence, it is possible to contribute to the enhancement of the resolution compared to a case where both the incident surface 22a and the emission surface 22b are formed of a reflective surface or a case where both the incident surface 22a and the emission surface 22b are formed of a flat surface. The incident surface 22a, the inner reflective surface 22b, and the emission surface 22c that are optical surfaces constituting the prism 22 each have an asymmetry with respect to the optical axis AX in first vertical directions D21, D22, and D23 that are in the off-axis plane SO parallel to the YZ plane and intersect with the optical axis AX, and have a symmetry with respect to the optical axis AX in the second transverse direction D02 or the X direction orthogonal to the first directions D21, D22, and D23. In the prism 22, a transverse width Ph in the transverse direction or the X direction is larger than a vertical width Pv in the vertical direction or the Y direction. In the prism 22, with respect to not only a profile but also an optical effective region, a transverse width in the transverse direction or the X direction is larger than a vertical width in the vertical direction or the Y direction. As a result, an angle of view in the transverse direction or the Y direction can be increased, and even when a line of sight largely changes transversely corresponding to a large transverse movement of the eye EY as described later, a user can visually recognize an image.

The prism 22 is made of a resin, for example, but may also be made of glass. A refractive index of a body of the prism 22 is set to a value such that total reflection at the inner surface is achieved by taking into account also reflection angles of the first image lights ML. A refractive index and an Abbe's number of the body of the prism 22 is preferably set by taking into account also the relationship with the projection lens 21. Particularly, by increasing the Abbe's number of the prism 22 and the projection lens 21, a chromatic dispersion remaining in the prism 22 and projection lens 21 as a whole is reduced. The optical surfaces of the prism 22, that is, the incident surface 22a, the inner reflective surface 22b, and the emission surface 22c are each formed of a free form surface, for example. The incident surface 22a, the inner reflective surface 22b, and the emission surface 22c are not limited to the free form surface, and may be formed of an aspheric surface respectively. In the prism 22, by forming the optical surfaces 22a, 22b, and 22c by the free form surface or the aspheric surface respectively, an aberration reduction can be achieved, and, particularly, when the optical surfaces 22a, 22b, and 22c are each formed of the free form surface, aberrations of the first virtual image optical system 12 that is the off-axis optical system or a non-coaxial optical system can be easily reduced thus enhancing the resolution. The inner reflective surface 22b is not limited to a reflective surface reflecting the first image lights ML by total reflection, and may be a reflective surface formed of a metal film or a dielectric multilayer film. In this case, a reflective film formed of a single layer film or a multilayer film made of metal such as Al or Ag, for example, is formed on the inner reflective surface 22b by vapor deposition or the like, or a sheet-like reflective film made of metal is made to adhere to the inner reflective surface 22b. Although detailed description is omitted, an antireflective film is formed on the incident surface 22a and the emission surface 22c.

The see-through mirror 23 is a plate-like optical member that functions as a concave surface mirror, and is configured to reflect the first image lights ML from the prism 22. The see-through mirror 23 covers the first exit pupil PP at which the eye EY or a pupil is located, and has a concave shape facing the first exit pupil PP. The see-through mirror 23 is a mirror plate having a structure in which a mirror film 23c is formed on one surface 23s of a plate-like body 23b. The reflective surface 23a of the see-through mirror 23 is a front reflective surface having light transmissivity. The see-through mirror 23 and the reflective surface 23a each have an asymmetry with respect to the optical axis AX in a first vertical direction D31 that is within the off-axis plane SO parallel to the YZ plane and intersects with the optical axis AX, and have a symmetry with respect to the optical axis AX in the second transverse direction D02 or the X direction orthogonal to the first direction D31. The reflective surface 23a of the see-through mirror 23 is a free form surface, for example. The reflective surface (front reflective surface) 23a is not limited to the free form surface, and may be an aspheric surface. By forming the see-through mirror 23 by the free form surface or the aspheric surface, the aberration reduction can be achieved and, particularly, when the free form surface is used as the see-through mirror 23, an aberration of the first virtual image optical system 12 that is an off-axis optical system or a non-coaxial optical system can be easily reduced. The see-through mirror 23 has a shape where an origin O of a curved surface equation is shifted toward a projection lens 21 side or a first display panel 11 side with respect to the effective region EA of the see-through mirror 23 in both a case where the reflective surface 23a is the free form surface and a case where the reflective surface 23a is the aspheric surface. In this case, an inclined surface of the see-through mirror that realizes the Z-shaped optical path can be set without imposing an excessive burden on designing of the optical system. The curved surface equation of the reflective surface 23a described above is illustrated by a curve CF of a double-dashed chain line on the off-axis plane SO, for example. Accordingly, the origin O providing symmetry is disposed between an upper end of the see-through mirror 23 and a lower end of the first display panel 11.

The see-through mirror 23 is a transmissive-type reflective element that allows a part of light to pass therethrough upon reflection of light, and the mirror film 23c of the see-through mirror 23 has semi-transmissivity. Accordingly, an external light OL passes through the see-through mirror 23 and hence, a user can view the external world in a see-through manner so that the user can view an external image and a virtual image in an overlapping manner. At this time, when the plate-like body 23b is thin, that is, when a thickness of the plate-like body 23b is equal to or less than approximately several millimeters, a change in magnification of the external image can be suppressed at a low level. A reflectance of the mirror film 23c with respect to the first image lights ML and the external light OL is set to 10% or more and equal to or less than 50% within a range of an estimated incident angle of the first image lights ML from a viewpoint of securing luminance of the first image lights ML and facilitating observation of an external image in a see-through manner. The plate-like body 23b that is a base material of the see-through mirror 23 is made of a resin, for example. However, the plate-like body 23b may also be made of glass. The plate-like body 23b is made of the same material as a support plate 54 that supports the plate-like body 23b from a periphery of the plate-like body 23b, and has the same thickness as the support plate 54. The mirror film 23c is formed of a dielectric multilayer film formed of a plurality of dielectric layers whose film thicknesses are adjusted, for example. The mirror film 23c may also be a single layer film or a multilayer film made of metal such as Al and Ag whose film thicknesses are adjusted. The mirror film 23c can be formed by lamination, but may also be formed by adhering a sheet-like reflective film.

To describe the optical path, the first image lights ML from the first display panel 11 are incident on the projection lens 21, and is emitted in a state of being substantially collimated by the projection lens 21. The first image lights ML that have passed through the projection lens 21 are incident on the prism 22 from the incident surface 22a while being refracted by the incident surface 22a, are reflected by the inner reflective surface 22b at a high reflectance close to 100%, and is refracted again at the emission surface 22c. The first image lights ML from the prism 22 are incident on the see-through mirror 23 and is reflected by the reflective surface 23a at a reflectance equal to or less than approximately 50%. The first image lights ML reflected by the see-through mirror 23 are incident on the first exit pupil PP where the eye EY or a pupil of the user US is located. The intermediate image IM is formed between the prism 22 and the see-through mirror 23 and close to the emission surface 22c of the prism 22. The intermediate image IM is formed by appropriately enlarging an image formed on the display surface 11a of the first display panel 11. On the first exit pupil PP, the external light OL that has passed through the see-through mirror 23 and the support plate 54 around the see-through mirror 23 is also incident. That is, the user US wearing the virtual image display device 100 can observe a virtual image formed by the first image lights ML in an overlapping manner with the external image.

As can be clearly understood from the comparison of the configuration illustrated in FIG. 4 and the configuration illustrated in FIG. 5, with respect to the FOV of the first virtual image optical system 12, a transverse visual field angle α2 is larger than a vertical visual field angle α1. Such setting of FOV in the first virtual image optical system 12 corresponds to a state where an image formed on the display surface 11a of the first display panel 11 is long in the horizontal direction. The description relating to an aspect ratio of the first display panel 11 is described later.

Figure 6:
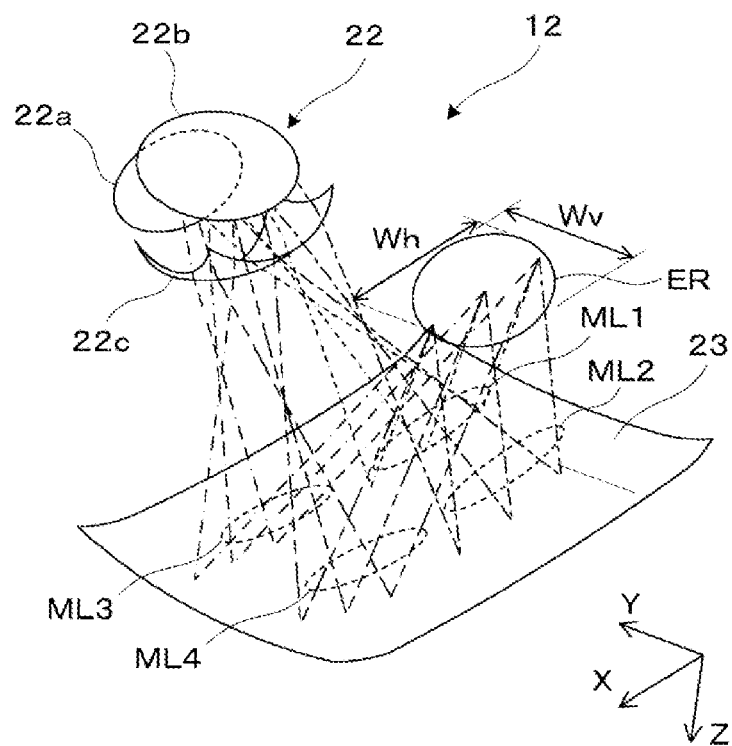
FIG. 6 is a perspective view for conceptually explaining image formation by the virtual image optical system according to the present embodiment.

FIG. 6 is a perspective view for conceptually explaining the image formation by the first virtual image optical system 12. In FIG. 6, first image light ML1 indicates a light beam from a right upper side in a field of view. First image light ML2 indicates a light beam from a right lower side in the field of view. First image light ML3 indicates a light beam from a left upper side in the field of view. First image light ML4 indicates a light beam from a left lower side in the field of view. In this case, the eye ring ER set to the first exit pupil PP has an eye ring shape or a pupil size such that a transverse pupil size Wh in the transverse direction or the X direction perpendicular to the off-axis plane SO is larger than a vertical pupil size Wv in the vertical direction or the Y direction that is within the off-axis plane SO and is orthogonal to the optical axis AX. That is, with respect to the pupil size at the exit pupil, a size in the transverse direction or the X direction orthogonal to the off-axis plane SO is wider than a size in the vertical direction or the Y direction orthogonal to the transverse direction. In a case where the angle of view or the field of view in the transverse direction is set larger than the angle of view or the field of view in the vertical direction, when the line of sight is changed corresponding to the angle of view, a position of the eye is largely moved in the transverse direction and hence, it is desirable to increase the pupil size in the transverse direction. That is, by increasing the transverse pupil size Wh of the eye ring ER compared to the vertical pupil size Wv of the eye ring ER, it is possible to prevent or suppress that an image is cut when the line of sight is largely changed in the transverse direction. In the case of the first virtual image optical system 12 illustrated in FIG. 4, the FOV is large in the transverse direction and is small in the vertical direction. As a result, the eye EY or the pupil of the user US also rotates within an angular range that is large in the transverse direction, and rotates in an angular range that is small in the vertical direction. Accordingly, the transverse pupil size Wh of the eye ring ER is set larger than the vertical pupil size Wv of the eye ring ER corresponding to the movement of the eye EY. As can be clearly understood from the above description, for example, when the FOV of the first virtual image optical system 12 is set to be larger in size in the vertical direction than in the transverse direction, it is desirable to set the transverse pupil size Wh of the eye ring ER smaller than the vertical pupil size Wv of the eye ring ER. As described above, when the optical axis AX from the see-through mirror 23 to the first exit pupil PP is directed downward, the inclination of the eye ring ER and the size of the eye ring ER in a strict sense must be considered using a downwardly inclined coordinate system of X0, Y0, and Z0 axes where the optical axis AX is set as the Z0 axis direction as the reference. In this case, the Y0 direction extending in the vertical direction does not agree with the vertical direction or the Y direction in a strict sense. However, in such a case where the inclination is not large, even if the inclination of the eye ring ER and the size of the eye ring ER are considered based on the coordinate system of X, Y, and Z axes, the inclination of the eye ring ER and the size of the eye ring ER take approximate values and hence, no problem arises.

Figure 7:
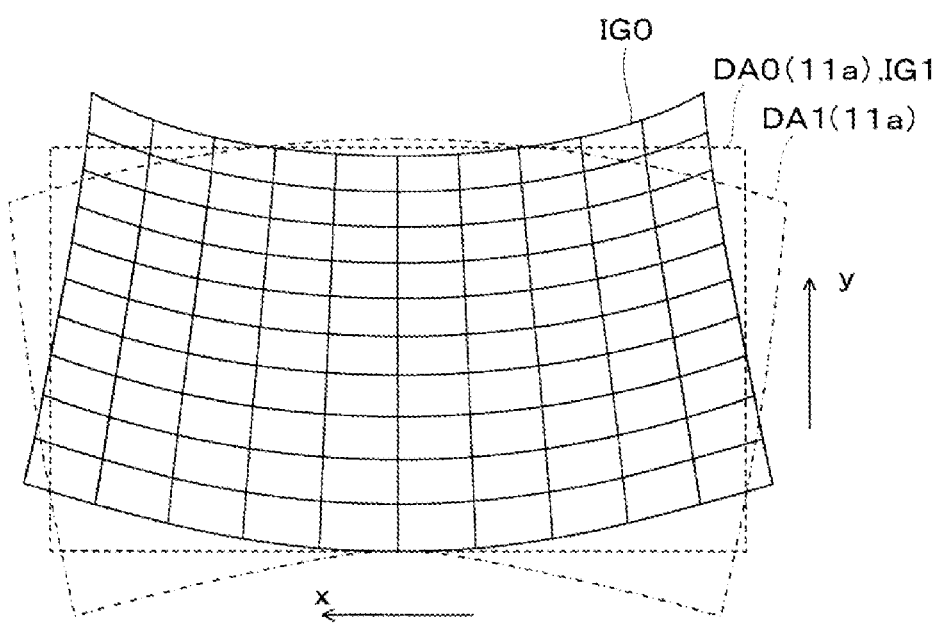
FIG. 7 is an explanatory view relating to distortion of a virtual image in the virtual image optical system according to the present embodiment.

As illustrated in FIG. 7, in a virtual image IG0 formed by the first virtual image optical system 12, distortion occurs due to optical factors such as magnification chromatic aberrations and distortion aberrations. For example, the virtual image IG0 formed by the first virtual image optical system 12 of the present embodiment does not become an image having a rectangular shape, but is distorted in a fan shape that is non-axisymmetric in the vertical direction along the Y direction. The first virtual image optical system 12 is the off-axis system 112 and hence, it is not easy to optically remove the distortion of the virtual image IG0. Accordingly, as described below, in the present embodiment, a reverse distortion for canceling the distortion of the virtual image IG0 is imparted to the first image DA1 displayed on the first display panel 11. That is, by forming the shape of the first image DA1 into a fan shape reverse to the shape of the virtual image IG0, the distortion of the virtual image IG0 is removed so that a virtual image IG1 having a rectangular shape is formed.

Figure 8:
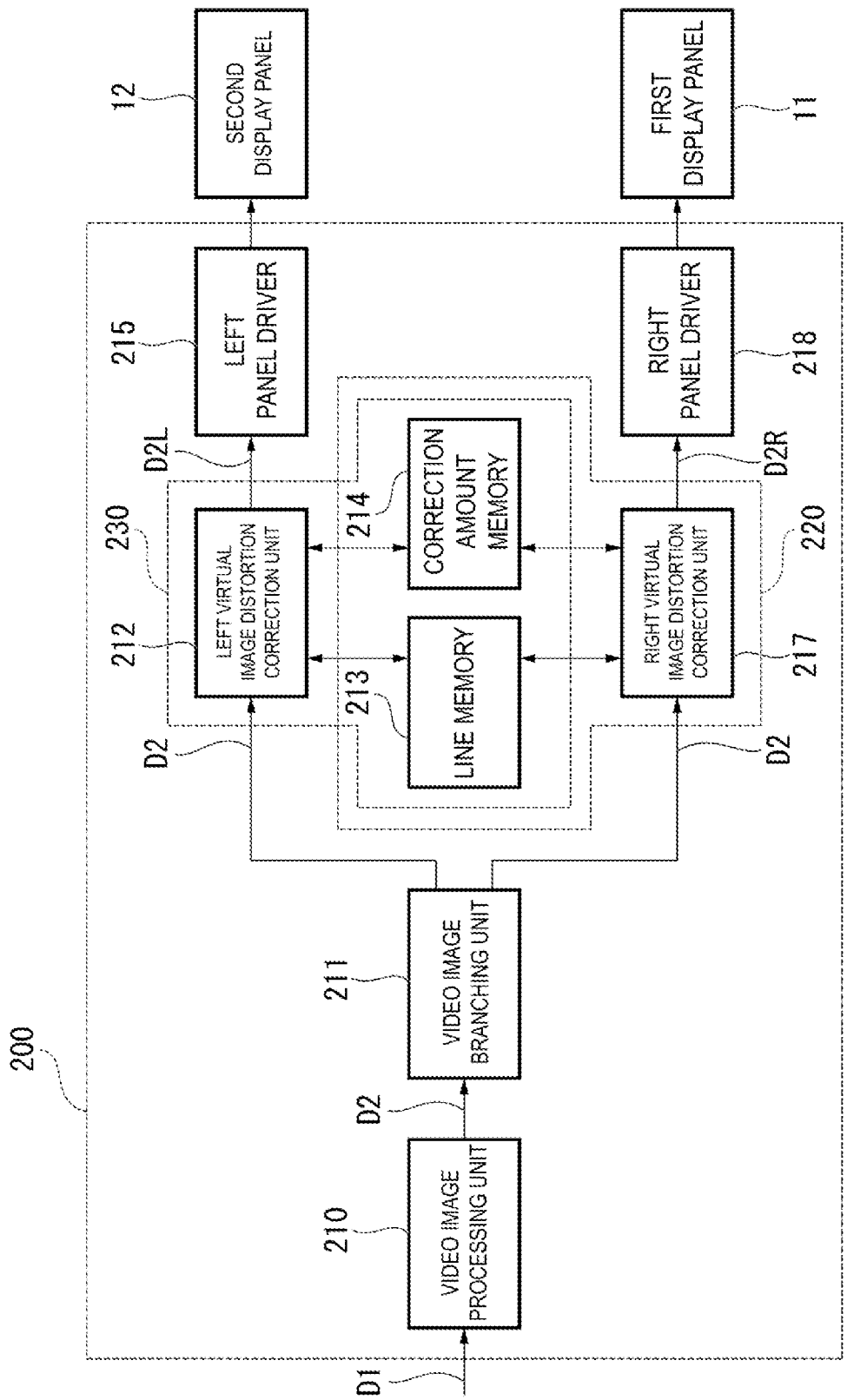
FIG. 8 is a block diagram illustrating a configuration of a control unit that the virtual image display device according to the present embodiment includes.

As illustrated in FIG. 8, the virtual image display device 100 of the present embodiment includes a control unit 200 configured to control the first display panel 11 for the right eye and the second display panel 12 for the left eye based on a video image signal D1 input to the control unit 200. The video image signal D1 is transmitted from a video image supply device not illustrated in the drawings to the virtual image display device 100 by wired communication or wireless communication. The video image supply device is a personal computer, a mobile communication terminal, a DVD player, and the like, for example. Although as described in detail later, the control unit 200 is configured to correct a video image signal D1 input to the control unit 200 into a first corrected video image signal D2R based on distortion generated in the first virtual image optical system 12, and to emit first image light from the first display panel 11 based on the first corrected video image signal D2R. The control unit 200 is configured to correct the video image signal D1 into a second corrected video image signal D2L based on distortion generated in the second virtual image optical system, and to emit a second image light from the second display panel 12 based on the second corrected video image signal D2L.

The control unit 200 includes a video image processing unit 210, a video image dividing unit 211, a right video image correction unit 220 (first video image correction unit) for the right eye, a right panel driver 218 (first panel drive unit) for the right eye, a left video image correction unit 230 (second video image correction unit) for the left eye, and a left panel driver 215 (second panel drive unit) for the left eye.

The video image processing unit 210 is configured to perform predetermined video image processing based on the video image signal D1 input to the video image processing unit 210, and to output the video image signal D2 obtained by the video image processing to the video image dividing unit 211. The video image processing unit 210 is configured to perform gamma correction processing and brightness correction processing as the predetermined video image processing, for example. The video image dividing unit 211 is configured to output the video image signal D2 input from the video image processing unit 210 to the right video image correction unit 220 and the left video image correction unit 230 in a divided manner.

The right video image correction unit 220 is configured to correct the video image signal D2 such that distortion for canceling the distortion of the virtual image formed by the first virtual image optical system 12 is imparted to the first image, and to output the corrected video image signal D2 to the right panel driver 218 as the first corrected video image signal D2R. As described above, the first image is an image displayed on the first display panel 11 for the right eye. To be more specific, as described with reference to FIG. 7, the right video image correction unit 220 is configured to correct the video image signal D2 such that a fan-shaped distortion reverse to a fan-shaped distortion of a vertical image formed by the first virtual image optical system 12 is imparted to the first image. The right panel driver 218 is configured to drive each pixel of the first display panel 11 based on the first corrected video image signal D2R input from the right video image correction unit 220. Since the right panel driver 218 drives each pixel of the first display panel 11 based on the first corrected video image signal D2R, the first image to which the fan-shaped distortion reverse to the fan-shaped distortion of the virtual image formed by the first virtual image optical system 12 is imparted is displayed on the first display panel 11.

The right video image correction unit 220 includes a line memory 213, a correction amount memory 214, and a right virtual image distortion correction unit 217. Hereinafter, before the description with respect to the line memory 213, the correction amount memory 214, and the right virtual image distortion correction unit 217 is made, an input image formed from pixel data in one frame period included in the video image signal D2 is described with reference to FIG. 9, and the first image to which the fan-shaped distortion reverse to the fan-shaped distortion of the virtual image formed by the first virtual image optical system 12 is imparted is described with reference to FIG. 10.

Figure 9:
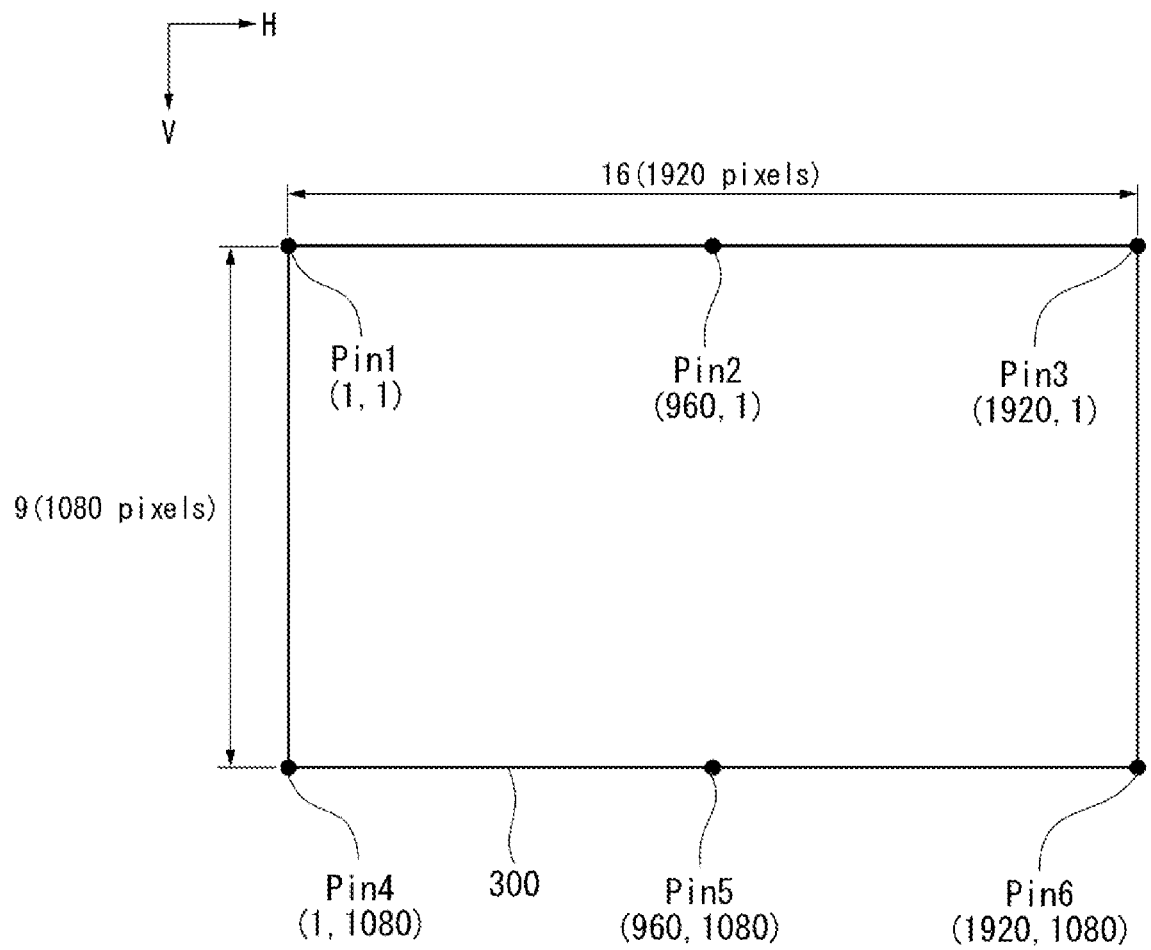
FIG. 9 is a view schematically illustrating an example of an input image formed based on pixel data in one frame period included in an input video image signal.

FIG. 9 is a view schematically illustrating an example of an input image 300 formed from pixel data in one frame period included in the video image signal D2. As illustrated in FIG. 9, an axis along a lateral direction (horizontal direction) of the input image 300 is assumed as an H axis, and an axis along a longitudinal direction (vertical direction) of the input image 300 is assumed as a V axis. The origin of the biaxial orthogonal coordinate system having the H axis and the V axis is set at a left upper corner of the input image 300. A direction from the origin toward a right side of the input image 300 along the horizontal direction is assumed as a +H direction, and a direction from the origin toward a lower side of the input image 300 along the vertical direction is assumed as a +V direction. For example, when a frame rate is 60 Hz, the one frame period is approximately 16 ms.

As illustrated in FIG. 9, the input image 300 has an aspect ratio and a resolution conforming to the full HD standard. That is, the aspect ratio of the input image 300 is 16:9. The resolution of the input image 300 is 1920 pixels×1080 pixels. The input image 300 is constituted by 2,073,600 pieces of pixels. Each pixel that constitutes the input image 300 may include a plurality of sub pixels aligned in the horizontal direction. For example, each pixel that constitutes the input image 300 may include three sub pixels, that is, a red sub pixel, a blue sub pixel, and a green sub pixel.

The H-axis coordinate h of each pixel constituting the input image 300 is expressed by an integer value included within a range of from the minimum value "1" to the maximum value "1920". The V-axis coordinate v of each pixel constituting the input image 300 is expressed by an integer value included within a range of from the minimum value "1" to the maximum value "1080". In the following description, out of the pixels constituting the input image 300, a group of pixels having the same V-axis coordinate v is referred to as a "v-th input line". That is, the input image 300 includes 1,080 input lines, in total, from the first input line to the 1,080th input line.

As illustrated in FIG. 9, out of the pixels constituting the input image 300, the pixels positioned at particular HV coordinates (h, v) are referred to as follows.

Out of the pixels constituting the input image 300, the pixel positioned at HV coordinates (1, 1) is referred to as "an input pixel Pin1". The input pixel Pin1 is a pixel positioned at a left end of the first input line.

Out of the pixels constituting the input image 300, a pixel positioned at HV coordinates (960, 1) is referred to as "an input pixel Pin2". The input pixel Pin2 is a pixel positioned at the center of the first input line.

Out of the pixels constituting the input image 300, a pixel positioned at HV coordinates (1920, 1) is referred to as "an input pixel Pin3". The input pixel Pin3 is a pixel positioned at a right end of the first input line.

Out of the pixels constituting the input image 300, a pixel positioned at HV coordinates (1, 1080) is referred to as "an input pixel Pin4". The input pixel Pin4 is a pixel positioned at a left end of the 1,080th input line.

Out of the pixels constituting the input image 300, a pixel positioned at HV coordinates (960, 1080) is referred to as "an input pixel Pin5". The input pixel Pin5 is a pixel positioned at the center of the 1,080th input line.

Out of the pixels constituting the input image 300, a pixel positioned at HV coordinates (1920, 1080) is referred to as "an input pixel Pin6". The input pixel Pin6 is a pixel positioned at a right end of the 1,080th input line.

Figure 10:
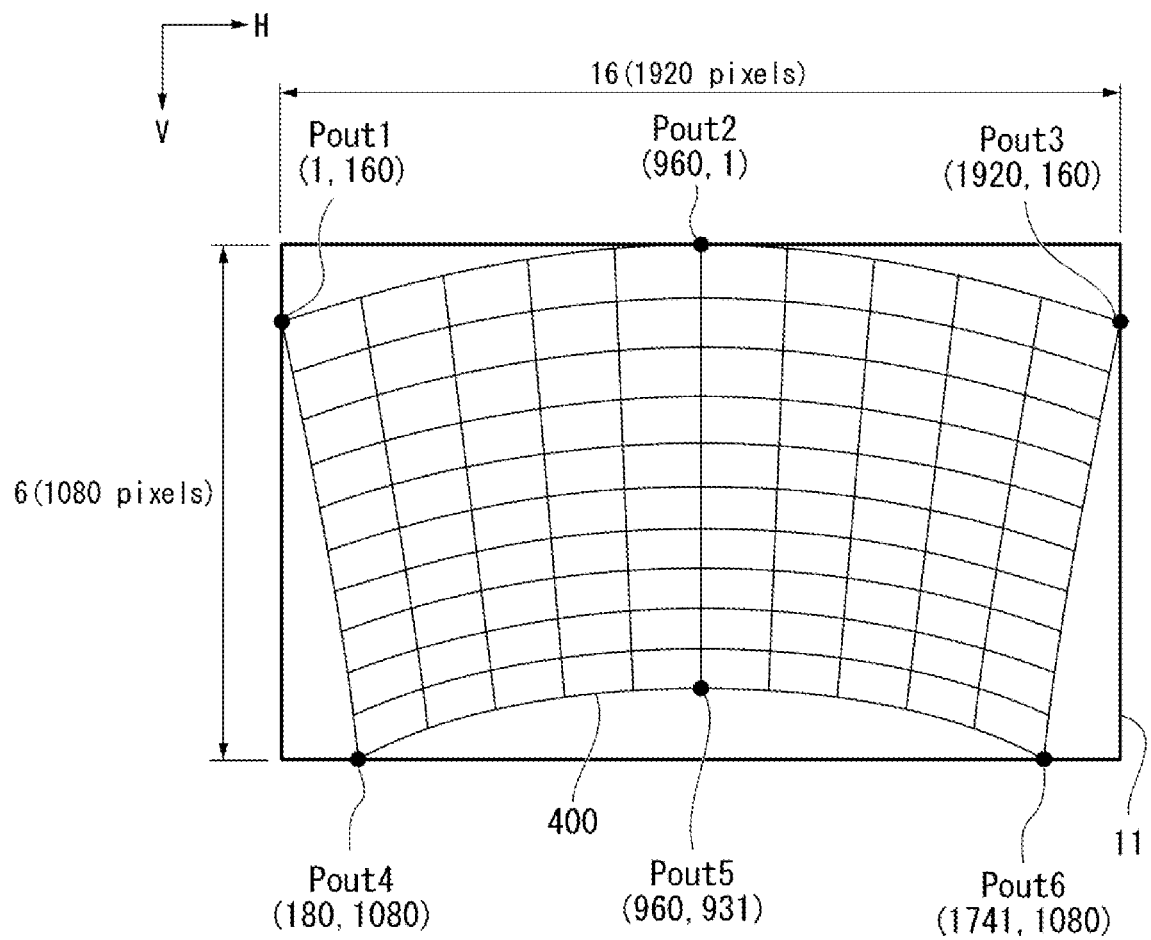
FIG. 10 is a view schematically illustrating an example of a first image to which a fan-shaped distortion reverse to a fan-shaped distortion of a virtual image formed by a first virtual image optical system is imparted.

FIG. 10 is a view schematically illustrating an example of a first image 400 to which a fan-shaped distortion reverse to a fan-shaped distortion of a virtual image formed by the first virtual image optical system 12 is imparted. As illustrated in FIG. 10, an axis along the transverse direction (horizontal direction) of the first display panel 11 is assumed as an H axis, and an axis along the longitudinal direction (vertical direction) of the first display panel 11 is assumed as a V axis. The origin of the biaxial orthogonal coordinate system having the H axis and the V axis is set at a left upper corner of the first display panel 11. A direction from the origin toward a right side of the first display panel 11 along the horizontal direction is assumed as a +H direction, and a direction from the origin toward a lower side of the first display panel 11 along the vertical direction is assumed as a +V direction. In the following description, "the first display panel 11" means "an effective display region of the first display panel 11".

As illustrated in FIG. 10, an aspect ratio of the video image signal D2, that is, the aspect ratio of the input image 300 and the aspect ratio of the first display panel 11 differ from each other. To be more specific, the aspect ratio of the video image signal D2 is 16:9, while the aspect ratio of the first display panel 11 is 16:6, for example. When the aspect ratio is expressed as a single numerical value, the aspect ratio of the video image signal D2 is approximately 1.78 (=16/9), and the aspect ratio of the first display panel 11 is approximately 2.67 (=16/6). That is, the aspect ratio of the first display panel 11 is larger than the aspect ratio of the video image signal D2. An aspect ratio of the first image 400 displayed on the first display panel 11 is equal to the aspect ratio of the first display panel 11. In the same manner, an aspect ratio of the second display panel 12 is approximately 2.67 (=16/6). That is, the aspect ratio of the second display panel 12 is larger than the aspect ratio of the video image signal D2. The aspect ratio of the second image displayed on the second display panel 12 is equal to the aspect ratio of the second display panel 12.

On the other hand, the resolution of the video image signal D2, that is, the resolution of the input image 300 and the resolution of the first display panel 11 are equal. That is, the resolution of the first display panel 11 is 1,920 pixels× 1,080 pixels. The first display panel 11 includes 2,073,600 pieces of pixels that are arranged in a matrix array. Each pixel in the first display panel 11 may include a plurality of sub pixels aligned in the horizontal direction. For example, each pixel in the first display panel 11 may include three sub pixels, that is, a red sub pixel, a blue sub pixel, and a green sub pixel.

The H-axis coordinate h of each pixel in the first display panel 11 is expressed by an integer value included within a range of from the minimum value "1" to the maximum value "1920". The V-axis coordinate v of each pixel included in the effective display region of the display panel is expressed by an integer value within a range of from the minimum value "1" to the maximum value "1080". In the following description, out of the pixels disposed in the first display panel 11, a group of pixels having the same V-axis coordinate v is referred to as a "v-th output line". That is, the first display panel 11 includes 1,080 pieces of output lines, in total, from the first output line to the 1,080th output line.

In order to obtain a resolution conforming to the full HD standard in the first display panel 11 having the aspect ratio of 16:6, the first display panel 11 of the present embodiment has the structural feature that a pixel pitch of the first display panel 11 in the vertical direction is gradually decreased in a direction from an upper side toward a lower side of the first display panel 11 in the vertical direction. That is, in the vertical direction of the first display panel 11, the pixels on an upper side in the vertical direction of the first display panel 11 have the larger pitch than that of the pixels on a lower side in the vertical direction of the first display panel 11. Further, a pixel size in the vertical direction of the first display panel 11 is gradually decreased in a direction from the upper side toward the lower side of the first display panel 11 in the vertical direction. That is, the pixels on the upper side in the vertical direction of the first display panel 11 have a larger pixel size than the pixels on the lower side in the vertical direction of the first display panel 11. Assuming the pixel size as PY, and assuming the coordinate of the pixel in the vertical direction of the first display panel 11 as v, the pixel size PY is expressed by the following equation (1). A unit of the pixel size PY is micrometers.

$$PY = -2.565e{-}9 \times v3 + 1.850e{-}3 \times v2 - 4.635e{-}2 \times v + 66 \qquad (1)$$

As illustrated in FIG. 10, out of the pixels constituting the first image 400, the pixels positioned at particular HV coordinates (h, v) are referred to as follows.

Out of the pixels constituting the first image 400, the pixel positioned at the HV coordinates (1, 160) is referred to as "an output pixel Pout1". The output pixel Pout1 is a pixel positioned at a left end of the 160th output line.

Out of the pixels constituting the first image 400, a pixel positioned at the HV coordinates (960, 1) is referred to as "an output pixel Pout2". The output pixel Pout2 is a pixel positioned at the center of the first output line.

Out of the pixels constituting the first image 400, a pixel positioned at the HV coordinates (1920, 160) is referred to as "an output pixel Pout3". The output pixel Pout3 is a pixel positioned at a right end of the first output line.

Out of the pixels constituting the first image 400, a pixel positioned at the HV coordinates (180, 1080) is referred to as "an output pixel Pout4". The output pixel Pout4 is a pixel positioned at the 1,080th output line.

Out of the pixels constituting the first image 400, a pixel positioned at the HV coordinates (960, 931) is referred to as "an output pixel Pout5". The output pixel Pout5 is a pixel positioned at the center of the 931th output line.

Out of the pixels constituting the first image 400, a pixel positioned at the HV coordinates (1741, 1080) is referred to as "an output pixel Pout6". The output pixel Pout6 is a pixel positioned at the 1,080th output line.

The line memory 213 stores the pixel data during one frame period included in the video image signal D2 in unit of the input line of the input image 300. To be more specific, the line memory 213 includes a plurality of storage regions for storing pixel data in unit of input line such as a storage region for storing a group of pixel data showing respective gray scale values of 1,920 pieces of pixels included in the first input line of the input image 300, a storage region for storing a group of pixel data showing respective gray scale values of 1,920 pieces of pixels included in the second input line of the input image 300, and the like. A writing operation and a reading operation of the pixel data in the line memory 213 are controlled by the right virtual image distortion correction unit 217. Hereinafter, a group of pixel data showing respective gray scale values of 1,920 pieces of pixels included in one input line is referred to as "input line data". For example, "first input line data" means a group of pixel data showing respective gray scale values of 1,920 pieces of pixels included in the first input line of the input image 300.

The correction amount memory 214 preliminarily stores a correction amount for correcting the video image signal D2 such that a fan-shaped distortion reverse to a fan-shaped distortion of the virtual image formed by the first virtual image optical system 12 is imparted to the first image. To be more specific, the correction amount memory 214 preliminarily stores a correction amount table showing a correspondence relationship between the HV coordinates of the pixel data included in the video image signal D2 (that is, the HV coordinates of each pixel constituting the input image 300) and the coordinate correction amount for converting the HV coordinates of the pixel data into the HV coordinates of the pixel of the first display panel 11 to be driven by the pixel data. The coordinate correction amount is a value obtained in advance by experimentation, numerical analysis, or the like.

The right virtual image distortion correction unit 217 is configured to control the writing operation and the reading operation of the pixel data in the line memory 213 in synchronism with a horizontal synchronization signal. When one frame period is 16 ms, a cycle of the horizontal synchronization signal is approximately 15 μs (=16 ms/1080). The right virtual image distortion correction unit 217 is configured to control the line memory 213 such that the input line data in one frame period is sequentially written in the line memory 213 in 15 μs cycles. The right virtual image distortion correction unit 217 is configured to read one or a plurality of pixel data included in one or a plurality of input line data from the line memory 213 in synchronism with the horizontal synchronization signal, and to output a group of read pixel data to the right panel driver 218 as output line data. The right virtual image distortion correction unit 217 is configured to determine the specific horizontal synchronization timing at which image data of specific HV coordinates is read based on the above-mentioned correction amount table stored in the correction amount memory 14.

The output line data means a group of pixel data showing respective gray scale values of 1,920 pieces of pixels included in one output line of the first display panel 11. For example, "first output line data" means a group of pixel data showing respective gray scale values of 1,920 pieces of pixels included in the first output line of the first display panel 11. Such output line data are outputted from the right virtual image distortion correction unit 217 to the right panel driver 218 in 15 μs cycles in synchronism with the horizontal synchronization signal. The first corrected video image signal D2R is a signal including the output line data outputted from the right virtual image distortion correction unit 217.

The output line data as described above are outputted from the right virtual image distortion correction unit 217 to the right panel driver 218 in 15 μs cycles in synchronism with the horizontal synchronization signal and hence, the first image 400 to which the fan-shaped distortion reverse to the fan-shaped distortion of the virtual image as illustrated in FIG. 10 is imparted is displayed on the first display panel 11.

For example, the output pixel Pout1 positioned at the HV coordinates (1, 160) in the first image 400 is a pixel driven by pixel data of the input pixel Pin1 positioned at the HV coordinate (1, 1) in the input image 300.

The output pixel Pout2 positioned at the HV coordinates (960, 1) in the first image 400 is a pixel driven by pixel data of the input pixel Pin2 positioned at the HV coordinates (960, 1) in the input image 300.

The output pixel Pout3 positioned at the HV coordinates (1920, 160) in the first image 400 is a pixel driven by pixel data of the input pixel Pin3 positioned at the HV coordinates (1920, 1) in the input image 300.

The output pixel Pout4 positioned at the HV coordinates (180, 1080) in the first image 400 is a pixel driven by pixel data of the input pixel Pin4 positioned at the HV coordinates (1, 1080) in the input image 300.

The output pixel Pout5 positioned at the HV coordinates (960, 931) in the first image 400 is a pixel driven by pixel data of the input pixel Pin5 positioned at the HV coordinates (960, 1080) in the input image 300.

The output pixel Pout6 positioned at the HV coordinates (1741, 1080) in the first image 400 is a pixel driven by pixel data of the input pixel Pin6 positioned at the HV coordinates (1920, 1080) in the input image 300.

The left video image correction unit 230 is configured to correct the image signal D2 such that distortion for canceling the distortion of the virtual image formed by the second virtual image optical system not illustrated in the drawings is imparted to the second image, and to output the corrected video image signal D2 to the left panel driver 215 as the second correction video image signal D2L. As described above, the second image is an image displayed on the second display panel 12 for the left eye. The left video image correction unit 230 is configured to correct the video image signal D2 such that a fan-shaped distortion reverse to the fan-shaped distortion of the virtual image formed by the second virtual image optical system is imparted to the second image. The left panel driver 215 is configured to drive each pixel of the second display panel 12 based on the second correction video image signal D2L input from the left video image correction unit 230. The left panel driver 215 drives each pixel of the second display panel 12 based on the second correction video image signal D2L and hence, a second image to which a fan-shaped distortion reverse to the fan-shaped distortion of the virtual image formed by the second virtual image optical system is imparted is displayed on the second display panel.

The left video image correction unit 230 includes a line memory 213, a correction amount memory 214, and a left virtual image distortion correction unit 212. The left video image correction unit 230 shares the line memory 213 and the correction amount memory 214 with the right video image correction unit 220. The line memory 213 stores the pixel data in one frame period included in the video image signal D2 in unit of input line of the input image 300. A writing operation and a reading operation of pixel data in the line memory 213 are controlled by the left virtual image distortion correction unit 212.

The correction amount memory 214 preliminarily stores a correction amount for correcting the video image signal D2 such that a fan-shaped distortion reverse to a fan-shaped distortion of the virtual image formed by the second virtual image optical system is imparted to the second image. To be more specific, the correction amount memory 214 preliminarily stores a correction amount table showing a correspondence relationship between the HV coordinates of the pixel data included in the video image signal D2 (that is, the HV coordinates of each pixel constituting the input image 300) and the coordinate correction amount for converting the HV coordinates of the pixel data into the HV coordinates of the pixel of the second display panel 12 to be driven by the pixel data.

The left virtual image distortion correction unit 212 is configured to control the writing operation and the reading operation of the pixel data in the line memory 213 in synchronism with a horizontal synchronization signal. The left virtual image distortion correction unit 212 is configured to control the line memory 213 such that the input line data in one frame period is sequentially written in the line memory 213 in 15 μs cycles. The left virtual image distortion correction unit 212 is configured to read one or a plurality of pixel data included in one or a plurality of input line data from the line memory 213 in synchronism with the horizontal synchronization signal, and to output a group of read pixel data to the left panel driver 215 as output line data. The left virtual image distortion correction unit 212 is configured to determine the specific horizontal synchronization timing at which image data of specific HV coordinates is read based on the above-mentioned correction amount table stored in the correction amount memory 14.

Such output line data are outputted from the left virtual image distortion correction unit 212 to the left panel driver 215 in 15 μs cycles in synchronism with the horizontal synchronization signal. The second correction video image signal D2L is a signal including the output line data outputted from the left virtual image distortion correction unit 212. The output line data as described above are outputted from the left virtual image distortion correction unit 212 to the left panel driver 215 in 15 μs cycles in synchronism with the horizontal synchronization signal and hence, the second image to which the fan-shaped distortion reverse to the fan-shaped distortion of the virtual image formed by the second virtual image optical system is imparted is displayed on the second display panel 12.

According to the virtual image display device 100 of the present embodiment as described above, a capacity of the line memory 213 used for virtual image distortion correction processing can be reduced. Hereinafter, the reasons why such technical effects can be acquired are described by comparing a comparison example and a present example with each other. First, the comparison example is described with reference to FIG. 11 to FIG. 13.

Figure 11:
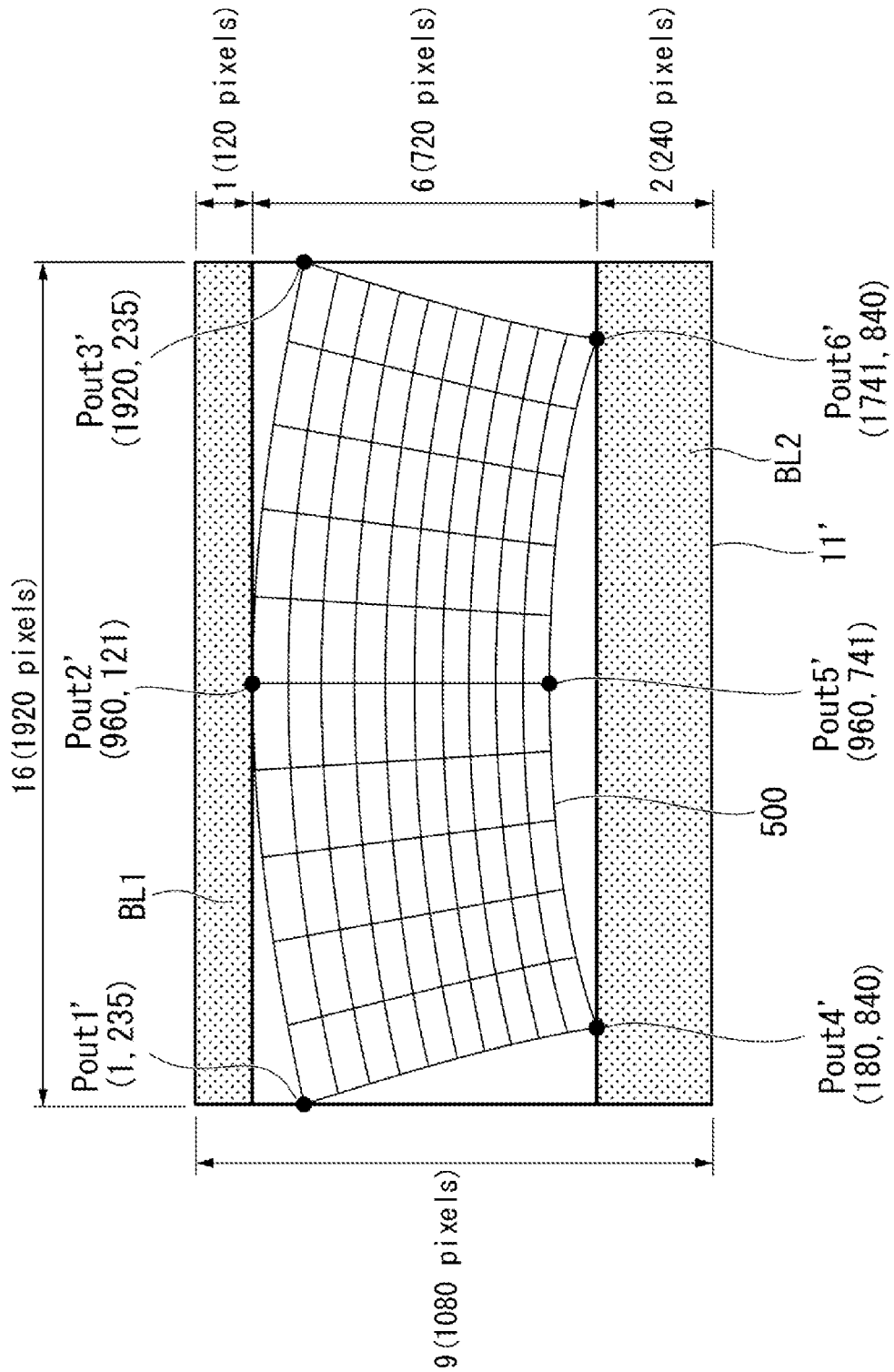
FIG. 11 is a view schematically illustrating an example of a first image displayed on a first display panel in a comparison example.

FIG. 11 is a view, in the comparison example, schematically illustrating an example of a first image 500 to which a fan-shaped distortion reverse to a fan-shaped distortion of a virtual image formed by the first virtual image optical system 12 is imparted. The first image 500 is a first image displayed on a first display panel 11' of the comparison example. As illustrated in FIG. 11, the aspect ratio of the video image signal D2, that is, the aspect ratio of the input image 300 and an aspect ratio of the first display panel 11' of the comparison example are equal. To be more specific, while the aspect ratio of the video image signal D2 is 16:9, the aspect ratio of the first display panel 11' of the comparison example is also 16:9.

The resolution of the video image signal D2, that is, the resolution of the input image 300 and a resolution of the first display panel 11' of the comparison example are equal. That is, the resolution of the first display panel 11' of the comparison example is 1,920 pixels×1,080 pixels. The first display panel 11' of the comparison example includes 2,073,600 pieces of pixels that are arranged in a matrix array. Each pixel in the first display panel 11' of the comparison example may include a plurality of sub pixels aligned in the horizontal direction. For example, each pixel in the first display panel 11' of the comparison example may include three sub pixels, that is, a red sub pixel, a blue sub pixel, and a green sub pixel.

In the first display panel 11' of the comparison example, an effective display region is divided into three regions, that is, an image display region where the first image 500 is displayed, an upper blank region BL1 that is a non-display region, and a lower blank region BL2 that is also a non-display area. The reason why the effective display region is divided into three regions, as described above, in the first display panel 11' of the comparison example is as follows. In a case where the aspect ratio of the video image signal D2 and the aspect ratio of the first display panel 11' of the comparison example are equal, when the aspect ratio of the first image 500 to which the fan-shaped distortion reverse to the fan-shaped distortion of the virtual image is imparted is made to agree with the aspect ratio of the first display panel 11' of the comparison example, that is, when the aspect ratio of the first image 500 is set to 16:9, a problem may arises that the virtual image formed by the first virtual image optical system 12 is visually recognized, by the user US, as an obscure image having color unevenness or the like at an upper end portion and a lower end portion of the virtual image. To solve this problem, in the first display panel 11' of the comparison example, the first image 500 is displayed in the image display region having the aspect ratio of 16:6 in a compressed manner, for example, out of the remaining regions of the effective display region, a region having an aspect ratio of 16:1 is assumed as the upper blank region BL1, and a region having an aspect ratio of 16:2 is assumed as the lower blank region BL2. Accordingly, it is possible to avoid that an upper end portion and a lower end portion of the virtual image are visually recognized as the obscure image by the user US. Accordingly, the aspect ratio of the first image 500 displayed on the first display panel 11' of the comparison example is different from the aspect ratio of the first display panel 11' of the comparison example.

The image display region in which the first image 500 of the comparison example is displayed includes 720 pieces of output lines, in total, from the 121th output line to the 840th output line. The upper blank region BL1 includes 120 pieces of output lines, in total, from the first output line to the 120th output line. The lower blank region BL2 includes 240 pieces of output lines, in total, from a 841th output line to a 1,080th output line.

As illustrated in FIG. 11, for example, an output pixel Pout1' positioned at HV coordinates (1, 235) in the first image 500 of the comparison example is a pixel driven by the pixel data of the input pixel Pin1 positioned at the HV coordinates (1, 1) in the input image 300.

An output pixel Pout2' positioned at HV coordinates (960, 121) in the first image 500 of the comparison example is a pixel driven by the pixel data of the input pixel Pin2 positioned at the HV coordinates (960, 1) in the input image 300.

The output pixel Pout3' positioned at HV coordinates (1920, 235) in the first image 500 of the comparison example is a pixel driven by the pixel data of the input pixel Pin3 positioned at the HV coordinates (1920, 1) in the input image 300.

The output pixel Pout4' positioned at HV coordinates (180, 840) in the first image 500 of the comparison example is a pixel driven by the pixel data of the input pixel Pin4 positioned at the HV coordinates (1, 1080) in the input image 300.

An output pixel Pout5' positioned at HV coordinates (960, 741) in the first image 500 of the comparison example is a pixel driven by the pixel data of the input pixel Pin5 positioned at the HV coordinate (960, 1080) in the input image 300.

An output pixel Pout6' positioned at HV coordinates (1741, 840) in the first image 500 of the comparison example is a pixel driven by the pixel data of the input pixel Pin6 positioned at the HV coordinate (1920, 1080) in the input image 300.

Figure 12:
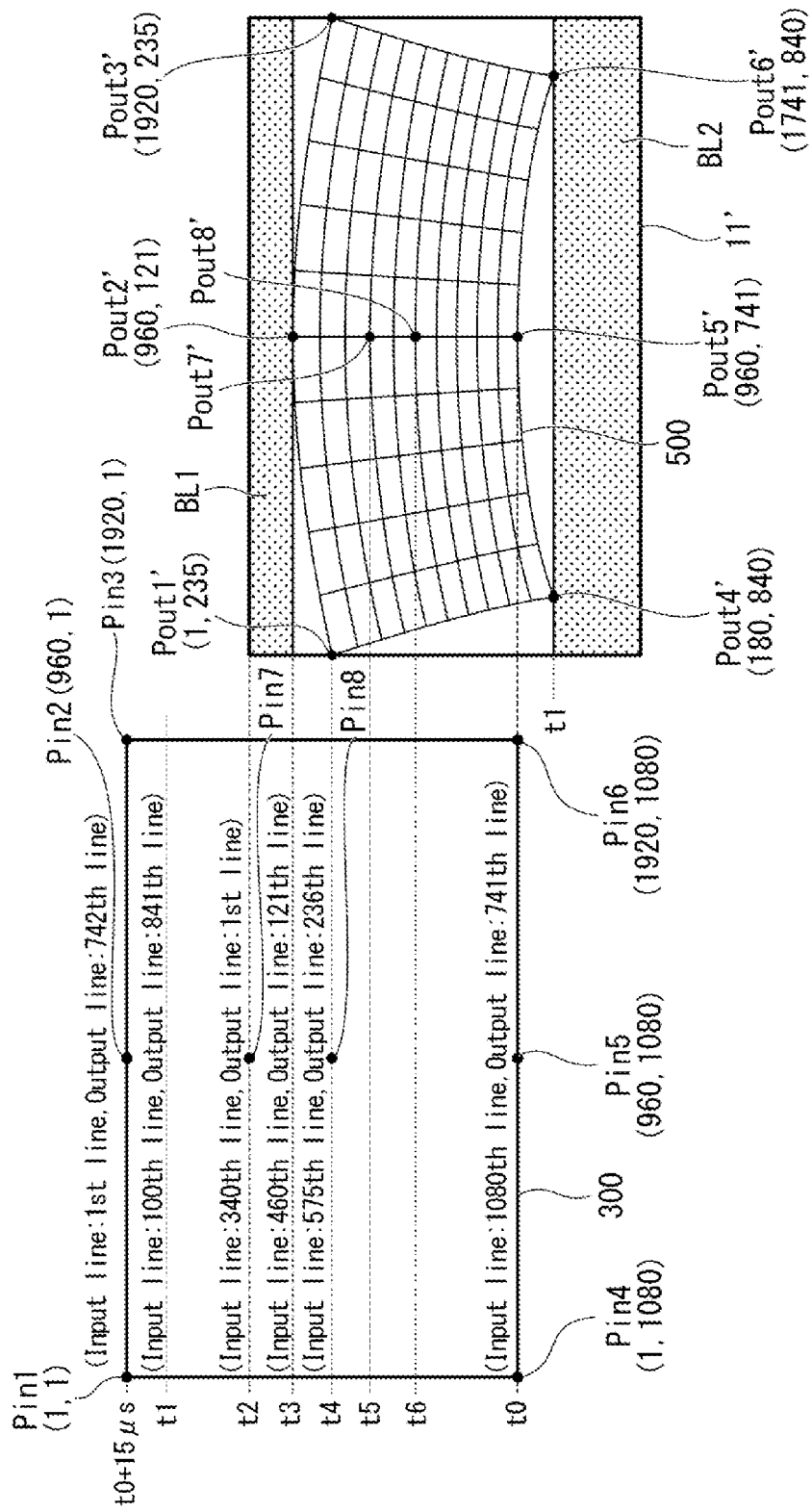
FIG. 12 is a view schematically illustrating a timing at which a right virtual image distortion correction unit writes input line data in a line memory, and a timing at which the right virtual image distortion correction unit reads pixel data from the line memory as output line data, in a comparison example.
Figure 13:
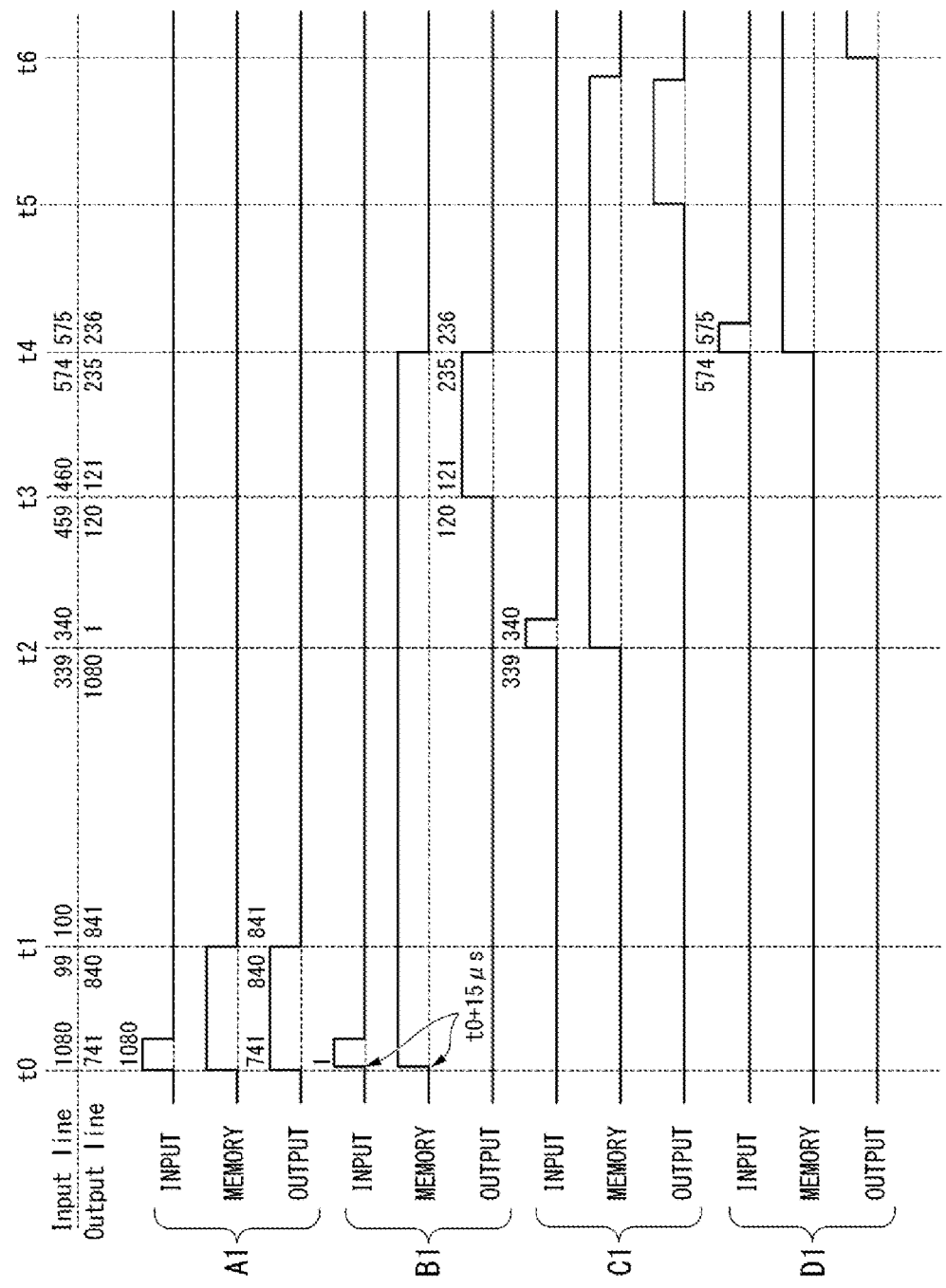
FIG. 13 is a timing chart corresponding to FIG. 12.

FIG. 12 is a view, in the comparison example, schematically illustrating a timing at which the right virtual image distortion correction unit 217 writes input line data in the line memory 213, and a timing at which the right virtual image distortion correction unit 217 reads pixel data from the line memory 213 as output line data. FIG. 13 is a timing chart corresponding to FIG. 12.

As illustrated in FIG. 12 and FIG. 13, a 1,080th input line included in the input image 300 is selected in synchronism with an edge of a horizontal synchronization signal generated at a time t0, and a 741th output line included in the first display panel 11' of the comparison example is selected. A first input line included in the input image 300 is selected in synchronism with an edge of a horizontal synchronization signal generated at a time t0+15 µs, and a 742th output line included in the first display panel 11' of the comparison example is selected. A 100th input line included in the input image 300 is selected in synchronism with an edge of a horizontal synchronization signal generated at a time t1, and a 841th output line included in the first display panel 11' of the comparison example is selected. During a period from the time t0 to the time t1, 100 pieces of input lines, in total, from the 1,080th input line to a 99th input line included in the input image 300 are sequentially selected at 15 µs cycles, and 100 pieces of output lines, in total, from the 741th output line to the 840th output line included in the first display panel 11' of the comparison example are sequentially selected at 15 µs cycles.

As illustrated in FIG. 12 and FIG. 13, a 340th input line included in the input image 300 is selected in synchronism with an edge of a horizontal synchronization signal generated at a time t2, and the first output line included in the first display panel 11' of the comparison example is selected. During a period from the time t1 to the time t2, 240 pieces of input lines, in total, from the 100th input line to a 339th input line included in the input image 300 are sequentially selected at 15 µs cycles, and 240 pieces of output lines, in total, from the 841th output line to the 1080th output line included in the first display panel 11' of the comparison example are sequentially selected at 15 µs cycles. That is, the period from the time t1 to the time t2 corresponds to a scanning period for scanning the lower blank region BL2 provided in the first display panel 11' of the comparison example.

As illustrated in FIG. 12 and FIG. 13, a 460th input line included in the input image 300 is selected in synchronism with an edge of a horizontal synchronization signal generated at a time t3, and a 121th output line included in the first display panel 11' of the comparison example is selected. During a period from the time t2 to the time t3, 120 pieces of input lines, in total, from the 340th input line to a 459th input line included in the input image 300 are sequentially selected at 15 µs cycles, and 120 pieces of output lines, in total, from the first output line to a 120th output line included in the first display panel 11' of the comparison example are sequentially selected at 15 µs cycles. That is, the period from the time t2 to the time t3 corresponds to a scanning period for scanning the upper blank region BL1 provided in the first display panel 11' of the comparison example.

As illustrated in FIG. 12 and FIG. 13, a 575th input line included in the input image 300 is selected in synchronism with an edge of a horizontal synchronization signal generated at a time t4, and a 236th output line included in the first display panel 11' of the comparison example is selected. During a period from the time t3 to the time t4, 115 pieces of input lines, in total, from the 460th input line to a 574th input line included in the input image 300 are sequentially selected at 15 µs cycles, and 115 pieces of output lines, in total, from the 121th output line to a 235th output line included in the first display panel 11' of the comparison example are sequentially selected at 15 µs cycles.

In a section A1 illustrated in FIG. 13, a waveform indicated by "INPUT" shows a timing at which the 1,080th input line data is written in the line memory 213. In the section A1, a waveform indicated by "MEMORY" shows a period during which the 1,080th input line data is held in the line memory 213. In the section A1, a waveform indicated by "OUTPUT" shows a timing at which the pixel data is read from the 1,080th input line data stored in the line memory 213, corresponding to the selected output line.

As illustrated in the section A1, at the time t0, the 1,080th input line data is written in the line memory 213, and the pixel data of the output pixel Pout5' included in the 741th output line (the pixel data of the input pixel Pin5) is read from the 1,080th input line data written in the line memory 213. In accordance with the read pixel data, the output pixel Pout5' included in the 741th output line emits light.

At a timing of a time t0+15 µs, pixel data of the output pixels included in the 742th output line are read from the 1,080th input line data written in the line memory 213. In accordance with the read pixel data, the output pixels included in the 742th output line emit light.

At a timing of a time t0+15 µs×2, pixel data of the output pixels included in the 743th output line are read from the 1,080th input line data written in the line memory 213. In accordance with the read pixel data, the output pixels included in the 743th output line emit light.

Thereafter, substantially the same operations are performed at 15 µs cycles, and at a timing of a time t0+15 µs×99, the pixel data of the output pixels Pout4' and Pout6' included in the 840th output line (the pixel data of the input pixels Pin4 and Pin6) are read from the 1,080th input line data written in the line memory 213. In accordance with the read pixel data, the output pixels Pout4' and Pout6' included in the 840th output line emit light.

In this manner, during the period from the time t0 to the time t1 (=t0+15 µs×100), the pixel data from the 741th output line to the 840th output line are sequentially read from the 1,080th input line data written in the line memory 213 at 15 µs cycles. Accordingly, out of curved lines constituting a profile of the first image 500 of the comparison example, a curved line corresponding to the 1,080th input line of the input image 300, that is, a curved line including the output pixels Pout4', Pout5', and Pout6' is displayed on the first display panel 11' of the comparison example. Accordingly, during the period from the time t0 to the time t1, the line memory 213 needs to hold the 1,080th input line data.

In a section B1 illustrated in FIG. 13, a waveform indicated by "INPUT" shows a timing at which the first input line data is written in the line memory 213. In the section B1, a waveform indicated by "MEMORY" shows a period during which the first input line data is held in the line memory 213. In the section B1, a waveform indicated by "OUTPUT" shows a timing at which the pixel data is read from the first input line data stored in the line memory 213, corresponding to the selected output line.

As illustrated in the section B1, at a time t0+15 μs, the first input line data is written in the line memory 213. However, the pixel data is not read from the first input line data written in the line memory 213 until the 121th output line is selected at the time t3.

At the time t3, the pixel data of the output pixel Pout2' included in the 121th output line (the pixel data of the input pixel Pin2) is read from the first input line data written in the line memory 213. In accordance with the read pixel data, the output pixel Pout2' included in the 121th output line emits light.

At a timing of a time t3+15 μs, pixel data of the output pixels included in a 122th output line are read from the first input line data written in the line memory 213. In accordance with the read pixel data, the output pixels included in the 122th output line emit light.

At a timing of a time t3+15 μs×2, pixel data of the output pixels included in a 123th output line are read from the first input line data written in the line memory 213. In accordance with the read pixel data, the output pixels included in the 123th output line emit light.

Thereafter, substantially the same operations are performed at 15 μs cycles, and at a timing of a time t3+15 μs×114, the pixel data of the output pixels Pout1' and Pout3' included in the 235th output line (the pixel data of the input pixels Pin1 and Pin3) are read from the first input line data written in the line memory 213. In accordance with the read pixel data, the output pixels Pout1' and Pout3' included in the 235th output line emit light. In this manner, during the period from the time t3 to the time t4 (=t3+15 μs×115), the pixel data from the 121th output line to the 235th output line are sequentially read from the first input line data written in the line memory 213 at 15 μs cycles. Accordingly, out of curved lines constituting a profile of the first image 500 of the comparison example, a curved line corresponding to the first input line of the input image 300, that is, a curved line including the output pixels Pout1', Pout2', and Pout3' is displayed on the first display panel 11' of the comparison example. Accordingly, during the period from a timing of the time t0+15 μs to the time t4, the line memory 213 needs to hold the first input line data.

In a section C1 illustrated in FIG. 13, a waveform indicated by "INPUT" shows a timing at which 340th input line data is written in the line memory 213. As illustrated in the section C1, at the time t2 at which the first output line is selected, 340th input line data is written in the line memory 213. In a section D1 illustrated in FIG. 13, a waveform indicated by "INPUT" shows a timing at which 575th input line data is written in the line memory 213. As illustrated in the section D1, at the time t4 at which the 236th output line is selected, the 575th input line data is written in the line memory 213.

As described above, in the comparison example, during a period from the timing of the time t0+15 μs to the time t4 at which the 340th input line data is written in the line memory 213, the line memory 213 needs to hold the first input line data. The period from timing of the time t0+15 μs to the time t4 includes a scanning period for scanning the upper blank region BL1 and a scanning period for scanning the lower blank region BL2. To be more specific, the period from the timing of the time t0+15 μs to the time t4 is 8,610 μs (=574×15 μs).

Next, the present example is described with reference to FIG. 14 and FIG. 15.

Figure 14:
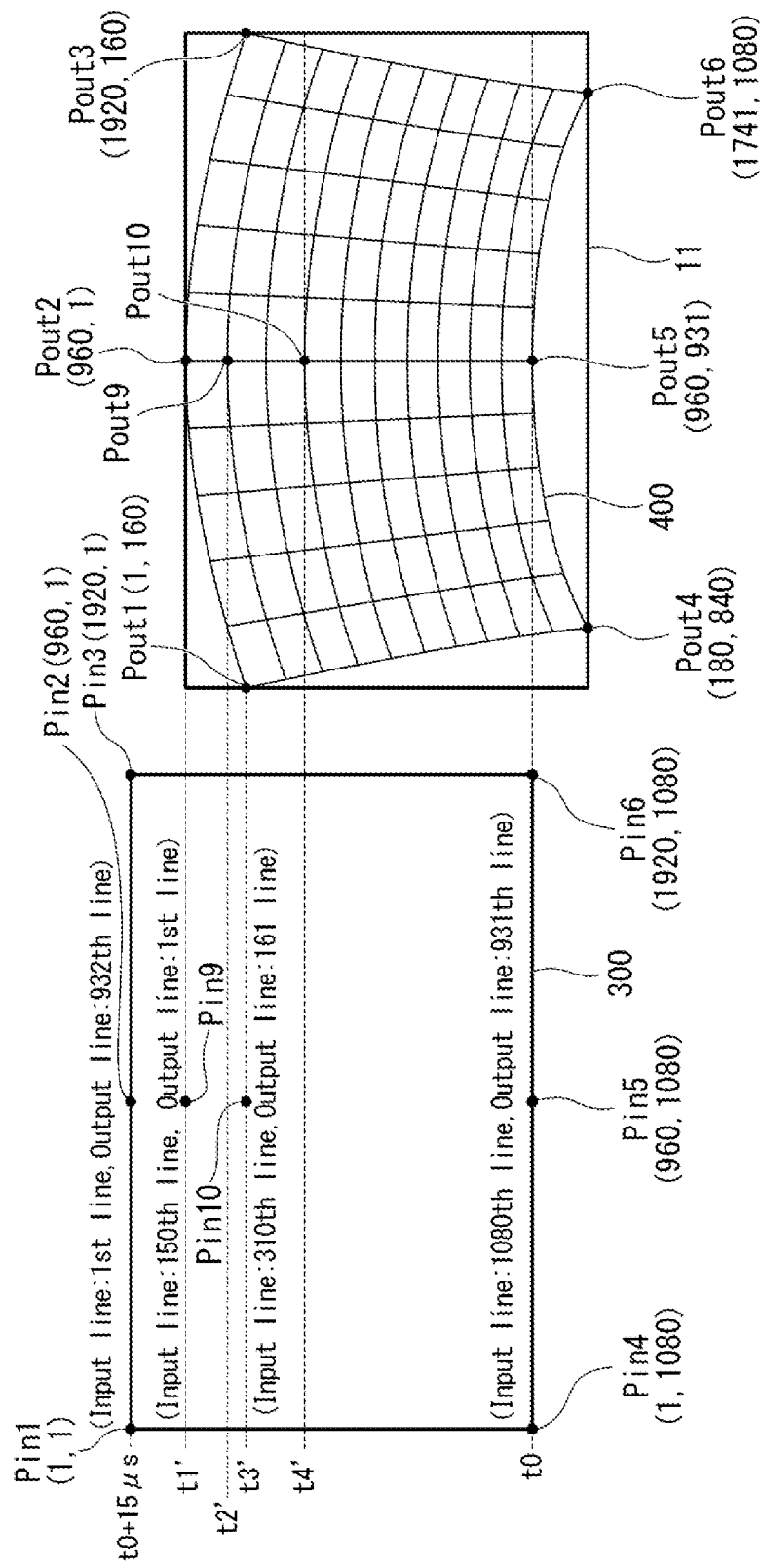
FIG. 14 is a view schematically illustrating a timing at which a right virtual image distortion correction unit writes input line data in the line memory, and a timing at which the right virtual image distortion correction unit reads pixel data from the line memory as output line data, in a present example.

FIG. 14 is a view, in the present example, schematically illustrating a timing at which the right virtual image distortion correction unit 217 writes input line data in the line memory 213, and a timing at which the right virtual image distortion correction unit 217 reads pixel data from the line memory 213 as output line data. FIG. 15 is a timing chart corresponding to FIG. 14.

Figure 15:
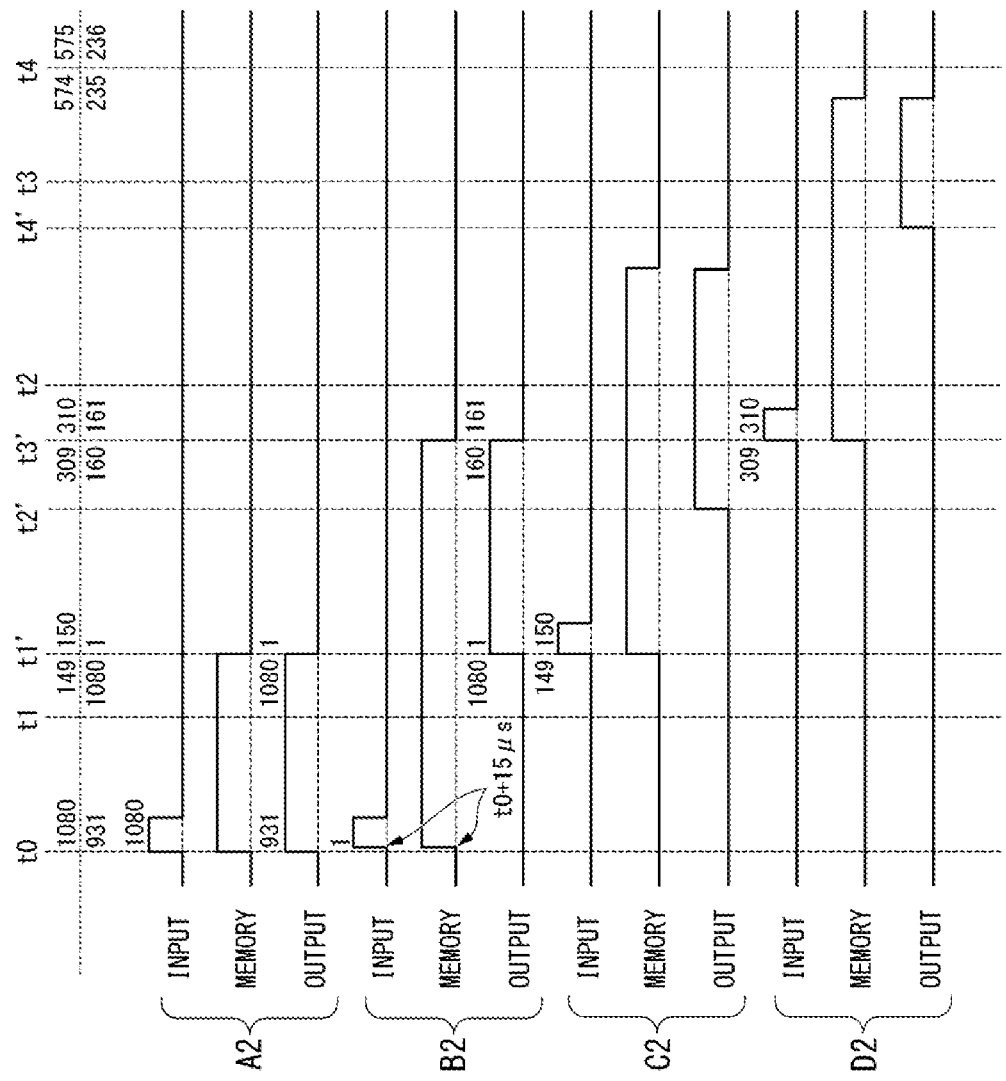
FIG. 15 is a timing chart corresponding to FIG. 14.

As illustrated in FIG. 14 and FIG. 15, a 1,080th input line included in the input image 300 is selected in synchronism with an edge of a horizontal synchronization signal generated at a time t0, and a 931th output line included in the first display panel 11 of the present example is selected. A first input line included in the input image 300 is selected in synchronism with an edge of a horizontal synchronization signal generated at a time t0+15 μs, and a 932th output line included in the first display panel 11 of the present example is selected. A 150th input line included in the input image 300 is selected in synchronism with an edge of a horizontal synchronization signal generated at a time t1', and a first output line included in the first display panel 11 of the present example is selected. During a period from the time t0 to the time t1', 150 pieces of input lines, in total, from the 1,080th input line to a 149th input line included in the input image 300 are sequentially selected at 15 μs cycles, and 150 pieces of output lines, in total, from the 931th output line to a 1,080th output line included in the first display panel 11 of the present example are sequentially selected at 15 μs cycles.

As illustrated in FIG. 14 and FIG. 15, a 310th input line included in the input image 300 is selected in synchronism with an edge of a horizontal synchronization signal generated at a time t3', and a 161th output line included in the first display panel 11 of the present example is selected. During a period from the time t1' to the time t3', 160 pieces of input lines, in total, from the 150th input line to a 309th input line included in the input image 300 are sequentially selected at 15 μs cycles, and 160 pieces of output lines, in total, from the first output line to a 160th output line included in the first display panel 11 of the present example are sequentially selected at 15 μs cycles.

In a section A2 illustrated in FIG. 15, a waveform indicated by "INPUT" shows a timing at which 1,080th input line data is written in the line memory 213. In the section A2, a waveform indicated by "MEMORY" shows a period during which the 1,080th input line data is held in the line memory 213. In the section A2, a waveform indicated by "OUTPUT" shows a timing at which the pixel data is read from the 1,080th input line data stored in the line memory 213, corresponding to the selected output line.

As illustrated in the section A2, at the time t0, the 1,080th input line data is written in the line memory 213, and the pixel data of the output pixel Pout5 included in the 931th output line (the pixel data of the input pixel Pin5) is read from the 1,080th input line data written in the line memory 213. In accordance with the read pixel data, the output pixel Pout5 included in the 931th output line emits light.

At a timing of the time t0+15 µs, pixel data of the output pixels included in a 932th output line are read from the 1,080th input line data written in the line memory 213. In accordance with the read pixel data, the output pixels included in the 932th output line emit light.

At a timing of a time t0+15 µs×2, pixel data of the output pixels included in a 933th output line are read from the 1,080th input line data written in the line memory 213. In accordance with the read pixel data, the output pixels included in the 933th output line emit light.

Thereafter, substantially the same operations are performed at 15 µs cycles, and at a timing of a time t0+15 µs×149, pixel data of the output pixels Pout4 and Pout6 included in the 1,080th output line (the pixel data of the input pixels Pin4 and Pin6) are read from the 1,080th input line data written in the line memory 213. In accordance with the read pixel data, the output pixels Pout4 and Pout6 included in the 1,080th output line emit light.

In this manner, during the period from the time t0 to the time t1' (=t0+15 µs×150), the pixel data from the 931th output line to the 1,080th output line are sequentially read from the 1,080th input line data written in the line memory 213 at 15 µs cycles. Accordingly, out of curved lines constituting a profile of the first image 400 of the present example, a curved line corresponding to the 1,080th input line of the input image 300, that is, a curved line including the output pixels Pout4, Pout5, and Pout6 is displayed on the first display panel 11 of the present example. Accordingly, during the period from the time t0 to the time t1', the line memory 213 needs to hold the 1,080th input line data.

In a section B2 illustrated in FIG. 15, a waveform indicated by "INPUT" shows a timing at which first input line data is written in the line memory 213. In the section B2, a waveform indicated by "MEMORY" shows a period during which the first input line data is held in the line memory 213. In the section B2, a waveform indicated by "OUTPUT" shows a timing at which the pixel data is read from the first input line data stored in the line memory 213, corresponding to the selected output line.

As illustrated in the section B2, at the time t0+15 µs, the first input line data is written in the line memory 213. However, the pixel data is not read from the first input line data written in the line memory 213 until the first output line is selected at the time t1'.

At the time t1', the pixel data of the output pixel Pout2 included in the first output line (the pixel data of the input pixel Pin2) is read from the first input line data written in the line memory 213. In accordance with the read pixel data, the output pixel Pout2 included in the first output line emits light.

At a timing of a time t1'+15 µs, pixel data of the output pixels included in a second output line are read from the first input line data written in the line memory 213. In accordance with the read pixel data, the output pixels included in the second output line emit light.

At a timing of a time t1'+15 µs×2, pixel data of the output pixels included in a third output line are read from the first input line data written in the line memory 213. In accordance with the read pixel data, the output pixels included in the third output line emit light.

Thereafter, substantially the same operations are performed at 15 µs cycles, and at a timing of a time t1'+15 µs×159, the pixel data of the output pixels Pout1 and Pout3 included in the 160th output line (the pixel data of the input pixels Pin1 and Pin3) are read from the first input line data written in the line memory 213. In accordance with the read pixel data, the output pixels Pout1 and Pout3 included in the 160th output line emit light.

In this manner, during the period from the time t1' to the time t3' (=t10+15 µs×160), the pixel data from the first output line to the 160th output line are sequentially read from the first input line data written in the line memory 213 at 15 µs cycles. Accordingly, out of curved lines constituting a profile of the first image 400 of the present example, a curved line corresponding to the first input line of the input image 300, that is, a curved line including the output pixels Pout1, Pout2, and Pout3 is displayed on the first display panel 11 of the present example. Accordingly, during the period from a timing of the time t0+15 µs to the time t3', the line memory 213 needs to hold the first input line data.

In a section C2 illustrated in FIG. 15, a waveform indicated by "INPUT" shows a timing at which 150th input line data is written in the line memory 213. As illustrated in the section C2, at the time t1' at which the first output line is selected, the 150th input line data is written in the line memory 213. As indicated by a waveform of "OUTPUT" in the section C2, a time t2' is a timing at which pixel data is started to be read from the 150th input line data stored in line memory 213. In a section D2 illustrated in FIG. 15, a waveform indicated by "INPUT" shows a timing at which 310th input line data is written in the line memory 213. As illustrated in the section D2, at the time t3' at which the 161th output line is selected, the 310th input line data is written in the line memory 213. As indicated by a waveform of "OUTPUT" in the section D2, a time t4' is a timing at which pixel data is started to be read from the 310th input line data stored in the line memory 213.

As described above, in the present example, during a period from the timing of the time t0+15 µs to the time t3' at which the 310th input line data is written in the line memory 213, the line memory 213 needs to hold the first input line data. Unlike the comparison example, the period from the timing of the time t0+15 µs to the time t3' does not include the scanning period for scanning the upper blank region BL1 and the scanning period for scanning the lower blank region BL2. To be more specific, the period from the timing of the time t0+15 µs to the time t3' is 4,635 µs (=309×15 µs).

To summarize the above-mentioned configurations, in the comparison example, the line memory 213 needs to hold the first input line data during the period of 8,610 µs. On the other hand, in the present example, the line memory 213 needs to hold the first input line data during the period of 4,635 µs. In other words, in the comparison example, unless a relatively long period of 8,610 µs has elapsed from the timing at which the first input line data is written in the line memory 213, the first input line data stored in the line memory 213 cannot be overwritten with another input line data. On the other hand, in the present example, when a relatively short period of 4,635 µs has elapsed from the timing at which the first input line data is written in the line memory 213, the first input line data stored in the line memory 213 can be overwritten with another input line data. Accordingly, in the present example, unlike the comparison example, the number of stages in storage region for storing input line data to be prepared in the line memory 213 can be reduced. As a result, in the present example, the capacity of the line memory 213 used for the virtual image distortion correction processing can be reduced.

As has been described above, in the present embodiment, the control unit 200 includes: the right video image correction unit 220 that is configured to correct the video image signal D2 such that distortion for canceling distortion of a virtual image formed by the first virtual image optical system 12 is imparted to the first image 400 and to output the corrected video image signal D2 as the first corrected video image signal D2R, and the right panel driver 218 that is configured to drive the first display panel 11 based on the first corrected video image signal D2R outputted from the right video image correction unit 220. Further, the aspect ratio of the video image signal D2 and the aspect ratio of the first display panel 11 differ from each other.

According to the present embodiment as described above, it is possible to avoid that the upper end portion and the lower end portion of the virtual image formed by the first virtual image optical system 12 are visually recognized as an obscure image by the user US without forming a blank region on an upper side and a lower side of the first image 400 displayed on the first display panel 11 and, at the same time, the capacity of the line memory 213 used for the virtual image distortion correction processing can be reduced.

As in the case of the above-described embodiment, it is preferable that a ratio in the transverse direction in the aspect ratio of the first display panel 11 be equal to a ratio in the transverse direction in the aspect ratio of the video image signal D2, and a ratio in the vertical direction in the aspect ratio of the first display panel 11 be smaller than a ratio in the vertical direction in the aspect ratio of the video image signal D2. Accordingly, a blank region originally required on the upper side and the lower side of the first image 400 displayed on the first display panel 11 can be removed with certainty, and the capacity of the line memory 213 used for the virtual image distortion correction processing can be largely reduced. However, it is preferable that, in order to obtain a resolution conforming to the full HD standard in the first display panel 11 having an aspect ratio of 16:6, the first display panel 11 have the structural feature that pixel pitches are gradually decreased in a direction from the upper side of the first display panel 11 in the vertical direction toward the lower side of the first display panel 11 in the vertical direction.

Here, the technical scope of the present disclosure is not limited to the above-described embodiment, and various modifications are conceivable without departing from the gist of the present disclosure.

For example, in the above-described embodiment, the description is made with respect to the configuration where the aspect ratio of the video image signal D2, that is, the aspect ratio of the input image 300 is 16:9, and the aspect ratio of the first display panel 11 is 16:6. However, the present disclosure is not limited to such a configuration, and it is sufficient that the aspect ratio of the video image signal and the aspect ratio of the first display panel differ from each other. Here, it is preferable that a ratio in the transverse direction in the aspect ratio of the first display panel be equal to a ratio in the transverse direction in the aspect ratio of the video image signal, and a ratio in the vertical direction in the aspect ratio of the first display panel be smaller than a ratio in the vertical direction in the aspect ratio of the video image signal.

In the above-described embodiment, the description is made with respect to the configuration where the resolution of the video image signal D2, that is, the resolution of the input image 300 and the resolution of the first display panel 11 are 1,920 pixels×1,080 pixels respectively. However, the present disclosure is not limited to such a configuration, and the resolution of the video image signal and the resolution of the first display panel may be a resolution conforming to a standard other than the full HD standard, and the resolution of the video image signal and the resolution of the first display panel 11 may differ from each other.

In the above-described embodiment, the description is made with respect to the configuration where the first display panel 11 is the OLED panel including the plurality of pixels each constituted of an organic light emitting diode. However, the present disclosure is not limited to such a configuration. The first display panel may be a self-luminous display panel such as an inorganic EL, an LED array, an organic LED, a laser array, a quantum dot light emitting element, or the like. Further, the first display panel is not limited to a self-luminous display panel. The first display panel may be a display panel that is formed of a liquid crystal display (LCD) or another light modulation element where an image is formed by illuminating the light modulation element by a light source such as a backlight. As the first display panel, a liquid crystal on silicon (LCoS) (LCoS is a registered trademark), a digital micromirror device, or the like may also be used.

In the above-described embodiment, the head-mounted display device is exemplified as the virtual image display device 100. However, the present disclosure is not limited to the head-mounted display device, and the virtual image display device may be a display device used in a different mode.

An optical module according to an aspect of the present disclosure may have the following configuration.

The optical module according to an aspect of the present disclosure includes: a first display panel configured to emit first image light, a first virtual image optical system configured to form a first exit pupil by the first image light emitted from the first display panel, and a control unit configured to control the first display panel based on an input video image signal, wherein an aspect ratio of the first display panel is larger than an aspect ratio of the video image signal, and the control unit is configured to correct the video image signal input to the control unit into a first correction video image signal based on distortion generated in the first virtual image optical system, and to emit the first image light from the first display panel based on the first correction video image signal.

In the optical module according to an aspect of the present disclosure, a resolution of the video image signal and a resolution of the first display panel may be equal.

In the optical module according to an aspect of the present disclosure, a pitch between pixels in the vertical direction of the first display panel may be set such that the pitch between the pixels on an upper side of the first display panel in the vertical direction is larger than the pitch between the pixels on a lower side of the first display panel in the vertical direction.

In the optical module according to an aspect of the present disclosure, a pixel size may be set such that the pixel size of the pixel on an upper side of the first display panel in the vertical direction is larger than the pixel size of the pixel on a lower side of the first display panel in the vertical direction.

In the optical module according to an aspect of the present disclosure, the pixel size PY may be expressed by the equation (1).

$$PY=-2.565e-9\times v3+1.850e-3\times v2-4.635e-2\times v+66 \quad (1)$$

where the pixel size is PY and a coordinate of a pixel in the vertical direction of the first display panel is v.

In the optical module according to an aspect of the present disclosure, an aspect ratio of the first image light emitted from the first display panel may be equal to an aspect ratio of the first display panel.

The optical module according to an aspect of the present disclosure may further include: a second display panel configured to emit a second image light, and a second virtual image optical system configured to form a second exit pupil by the second image light emitted from the second display panel, and an aspect ratio of the second display panel may be larger than an aspect ratio of the video image signal, and the control unit may be configured to control the second display panel based on the input video image signal, to correct the video image signal into a second correction video image signal based on distortion generated in the second virtual image optical system, and to emit the second image light from the second display panel based on the second correction video image signal.

The optical module according to an aspect of the present disclosure may be non-axisymmetric in the vertical direction.

The virtual image display device according to an aspect of the present disclosure may have the following configuration.

The virtual image display device according to an aspect of the present disclosure includes the optical module according to an aspect of the present disclosure.

The virtual image display device according to an aspect of the present disclosure may be a head-mounted display device.

What is claimed is:

1. An optical module comprising:
   a first display panel;
   a first optical system that forms an exit pupil; and
   a control unit that corrects an input image to a first image based on distortion generated in the first optical system, an aspect ratio of the input image being smaller than an aspect ratio of the first display panel, wherein
   the control unit causes the first display panel to display the first image, and
   the control corrects the input image such that a first length corresponding to a center of the first image in the first direction is different from a second length corresponding to an end of the first image in the first direction, the first direction along an input line on the first display panel.

2. The optical module according to claim 1, wherein
   a resolution of the input image is equal to a resolution of the first display panel.

3. The optical module according to claim 1, wherein,
   in the first display panel, a pitch between pixels on an upper side in a second direction intersecting the first direction is larger than a pitch between pixels on a lower side.

4. The optical module according to claim 1, wherein
   in the first display panel, a pixel size of a pixel on an upper side in a second direction intersecting the first direction is larger than a pixel size of a pixel on a lower side in the second direction.

5. The optical module according to claim 4, wherein $$PY=-2.565e-9\times v3+1.850e-5\times v2-4.635e-2\times v+66 \qquad (1)$$

where the pixel size is PY and a coordinate of the pixel in the second direction of the first display panel is v.

6. The optical module according to claim 1, wherein
   an aspect ratio of the first image is equal to the aspect ratio of the first display panel.

7. The optical module according to claim 1 further comprising:
   a second display panel; and
   a second optical system that forms a second exit pupil, wherein
   the control unit corrects an input image to a second image based on distortion generated in the second optical system, the aspect ratio of the input image being smaller than an aspect ratio of the second display panel, and
   the control unit causes the second display panel to display the second image.

8. The optical module according to claim 1, wherein
   the optical module is non-axisymmetric in the second direction.

9. A virtual image display device comprising the optical module according to claim 1.

10. The virtual image display device according to claim 9, wherein
    the virtual image display device is a head-mounted display device.

11. The optical module according to claim 1, wherein
    the control unit corrects the input image such that the second length is longer than the first length.

12. The optical module according to claim 1, wherein
    the control unit corrects the input image such that a third length corresponding to an one side of the first image in a second direction intersecting the first direction is different from a fourth length corresponding to another side of the first image in the second direction.

13. The optical module according to claim 12, wherein
    the second direction is a vertical direction in the first display panel,
    the one side of the first image is an upper side of the first image in the second direction,
    the other side of the first image is lower side of the first image in the second direction, and
    the control unit corrects the input image such that the third length is longer than the fourth length.

* * * * *